(12) United States Patent
Singh et al.

(10) Patent No.: US 10,496,735 B2
(45) Date of Patent: Dec. 3, 2019

(54) OBJECT INTERACTION PRESERVATION FROM DESIGN TO DIGITAL PUBLICATION

(71) Applicant: Adobe Inc., San Jose, CA (US)

(72) Inventors: Monica Singh, Agra (IN); Sagar Khanna, Ghaziabad (IN); Pushp Parag Agarwal, Noida (IN); Gaurav Bhargava, Noida (IN); Ankur Gupta, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 299 days.

(21) Appl. No.: 15/284,236

(22) Filed: Oct. 3, 2016

(65) Prior Publication Data

US 2018/0095942 A1    Apr. 5, 2018

(51) Int. Cl.
*G06F 17/21* (2006.01)
*G06F 17/22* (2006.01)
*G06F 17/24* (2006.01)

(52) U.S. Cl.
CPC ........ *G06F 17/2247* (2013.01); *G06F 17/211* (2013.01)

(58) Field of Classification Search
CPC .. G06F 17/211; G06F 17/212; G06F 17/2247; G06F 17/248; G06F 17/2705
See application file for complete search history.

(56) References Cited

U.S. PATENT DOCUMENTS

| | | | |
|---|---|---|---|
| 9,563,929 B1* | 2/2017 | Sokolowski | G06T 1/20 |
| 9,953,014 B1* | 4/2018 | Reshadi | G06F 17/2247 |
| 2008/0082907 A1* | 4/2008 | Sorotokin | G06F 17/212 |
| | | | 715/210 |
| 2009/0228782 A1* | 9/2009 | Fraser | G06F 17/30905 |
| | | | 715/234 |
| 2015/0185994 A1* | 7/2015 | Antipa | G06F 17/2247 |
| | | | 715/201 |
| 2016/0203106 A1* | 7/2016 | Deguzman | G06F 17/211 |
| | | | 715/201 |

* cited by examiner

*Primary Examiner* — Ariel Mercado
(74) *Attorney, Agent, or Firm* — SBMC

(57) ABSTRACT

Object interaction preservation from design to digital publication is described. In example embodiments, a design includes overlapping objects with object interaction effects. The design has a document object model (DOM). A digital publishing module constructs a DOM tree with each node having an object of the design. The DOM tree is analyzed to identify objects that interact with an overlapped object. Objects with dynamic content and those with no overlapped object can be excluded. A bounding region of each identified object is investigated with regard to object layering data and object interaction attributes. Based on these design aspects, the digital publishing module prepares an object snapshot of the bounding region to reflect an appearance resulting from the interactive objects within the bounding region. The object snapshot is incorporated into a digital publication DOM tree while maintaining the object layering data. Using this DOM tree, the module produces a digital publication.

20 Claims, 16 Drawing Sheets

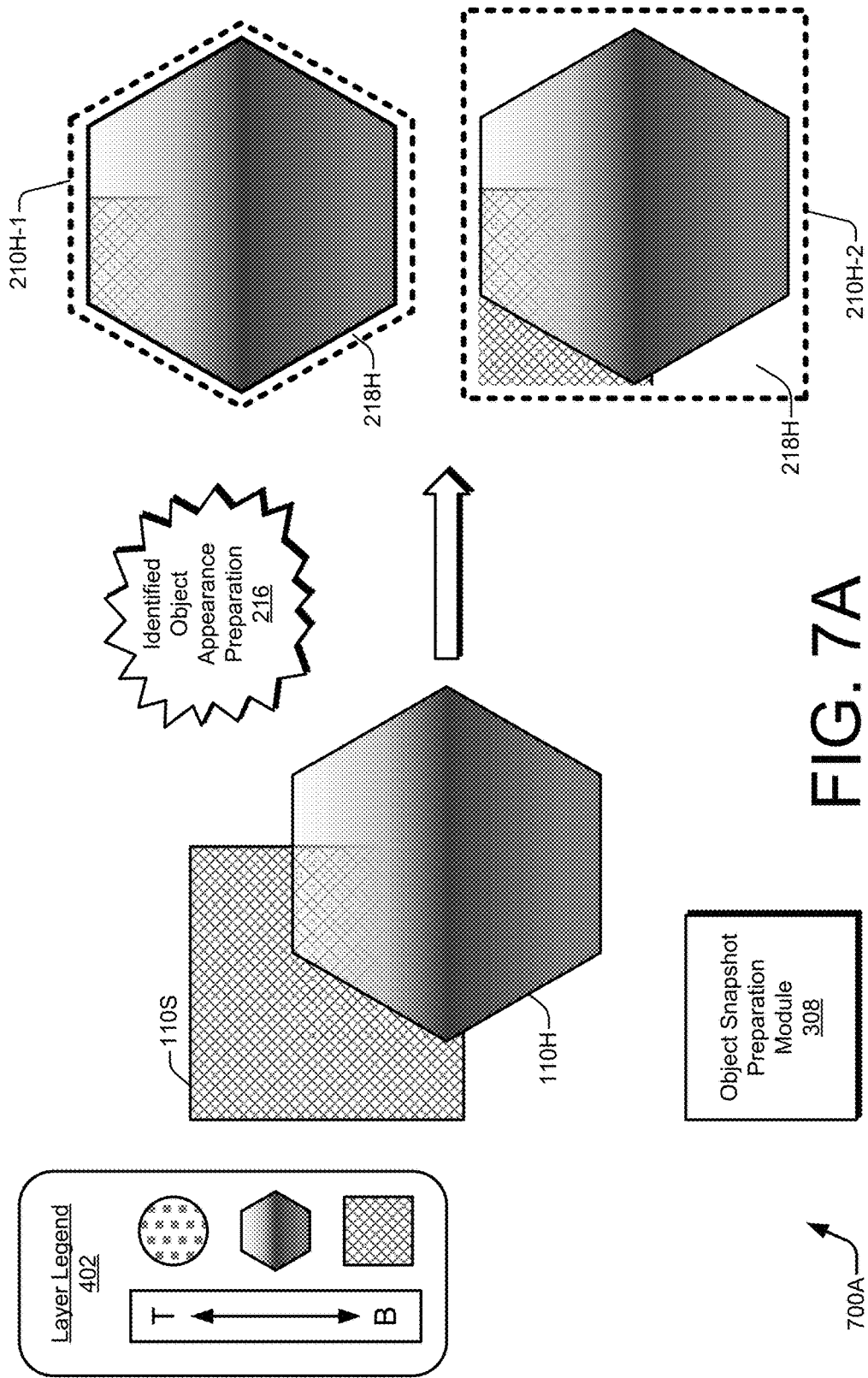

OBJECT INTERACTION PRESERVATION FROM DESIGN TO DIGITAL PUBLICATION

BACKGROUND

Creative professionals often utilize a variety of images as part of media content creation. Examples of images include geometric shapes, photographs, illustrations, drawings, and textual items. Media content creation can include production of many different types of designs, including those for marketing materials, books, magazines, presentations, web pages, advertisements, application interfaces that are based on web technologies, and so forth. For each of these different types of designs, creative professionals select and carefully arrange images to create a desired appearance for the media content. The appearance of a design is intended to establish a mood, convey a particular aesthetic, engender an emotion, communicate a meaning, provide a unifying theme, generate interest, and so forth. Thus, preserving the appearance of a design is important to meeting the goals of a creative professional.

Generally, images and other individual aspects of a design may be considered objects that make up a design. Using a design application, a creative professional develops a design by selecting objects and arranging the objects on a digital canvas. Objects can be placed at any planar location along horizontal and vertical directions of the digital canvas. Creative professionals are further empowered to layer objects by placing one object at least partially over another object. In other words, different objects can be positioned in different layers, including in an overlapping manner, along a depth direction associated with the digital canvas.

When one object is positioned above another object from a depth perspective, the two objects can interact with each other visually. If two overlapping objects interact with each other, the combined appearance of the two objects changes in accordance with the type of interaction at least in the area in which the objects overlap. Thus, objects can interact with one another to produce various visual effects. Examples of object interaction effects include transparency, opacity, blending, shadow, glow, feathering, group knockout, and combinations thereof. Each of these interaction effects may offer "sub-effects" that allow for different types of the main effect. For instance, different types of blending effects include normal, multiplication, lighting, hue or saturation, difference, screen, combinations thereof, and so forth.

After a creative professional completes a design, the objects of the design appear on a display screen for the design application in a desired manner so as to achieve the goals of the creative professional. The design application can print the design so as to have the desired appearance of the objects, including the object interaction effects. However, the design cannot reach a widespread target audience in today's electronically-connected world without publishing the design digitally. A digital publication can be disseminated through many different electronic channels, such as the web (e.g., using hypertext markup language (HTML)), ebooks, and individual media content applications. Unfortunately, producing a digital publication from a design that includes layered objects having interaction effects is difficult. Existing strategies for digital publication fail to maintain the appearance of layered objects that interact with one another to create visual effects. For example, the visual effects resulting from interaction among overlapping objects can be dropped when a digital publication is produced. Object interaction can also be corrupted such that the resulting visual appearance differs from what a designer intended.

To address these problems with maintaining object interaction effects during the publication of a design, a conventional approach is to rasterize an entire design to generate a single bitmapped image for the digital publication. However, using a single image precludes the reformatting of objects to account for different screen sizes and resolutions as the digital publication is disseminated to different devices having different form factors and display capabilities—such as smart phones and desktop computers. Moreover, publishing a design using a single bitmapped image prevents the inclusion of a dynamic object, such as a graphics interchange format (GIF) item, in the digital publication. Consequently, the immense variety of object interaction effects that are available in many design applications continue to be essentially unusable in designs that are intended for distribution across diverse digital publication channels.

SUMMARY

Object interaction preservation from design to digital publication is described. Techniques and systems described herein enable a visual appearance of multiple overlapping objects to be preserved including a visual appearance that results from object interaction effects, such as transparency and blending modes. In one or more example embodiments, a computing device analyzes a design to identify an object that is associated with an object interaction effect and also overlaps another object. An object snapshot is prepared that replicates a visual appearance of the object based on the overlapped object and the associated object interaction effect. To produce a digital publication, the computing device incorporates the object snapshot into the digital publication by replacing the object with the object snapshot. Thus, the visual appearance of the object interaction effect is preserved as the design is converted to a digital publication.

In some embodiments, a digital publishing module executing on a computing device preserves a visual appearance of object interaction using a document object model (DOM)-based approach that includes both a design DOM and a digital publication DOM. A design including multiple objects is obtained via a design application, with the design having a corresponding design DOM. From the design DOM, the digital publishing module constructs a design DOM tree having multiple nodes, with each respective node of the multiple nodes corresponding to a respective object of the multiple objects from the design.

The design DOM tree is traversed to analyze each of the objects of the multiple nodes. The digital publishing module identifies an object for appearance preparation if the object overlaps at least one other object and is associated with at least one object interaction effect. More specifically, an object can be identified if the object interaction effect causes a visual appearance of the design to be based on an appearance of the object in conjunction with an appearance of the overlapped object. Objects that are not positioned on top of another object and objects that have dynamic content with a dynamic appearance in the design, for example, can be excluded from the identified objects. Each identified object corresponds to a bounding region that maps to an area containing the object within the design.

The digital publishing module prepares an object snapshot for an identified object based on the associated object interaction effect and responsive to one or more objects that are positioned under the object. The object snapshot corresponds to the bounding region of the object and replicates an appearance of the bounding region. The digital publishing module incorporates the object snapshot into a digital publication DOM tree by replacing the object with the object snapshot. To implement such a replacement, a node including the object in the design DOM tree corresponds, for example, to a node in which the object snapshot is incorporated in the digital publication DOM tree for a digital publication DOM. The digital publishing module produces a digital publication based on the digital publication DOM. By pre-computing a visual appearance of the object in conjunction with overlapped objects and the application of at least one object interaction effect, the visual appearance of the object interaction is preserved as the design is converted into a digital publication.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the description or in the drawings.

FIGS. 7A and 7B illustrate examples of object snapshot preparation for two interactive objects of the design.

DETAILED DESCRIPTION

Overview

Figure 1:
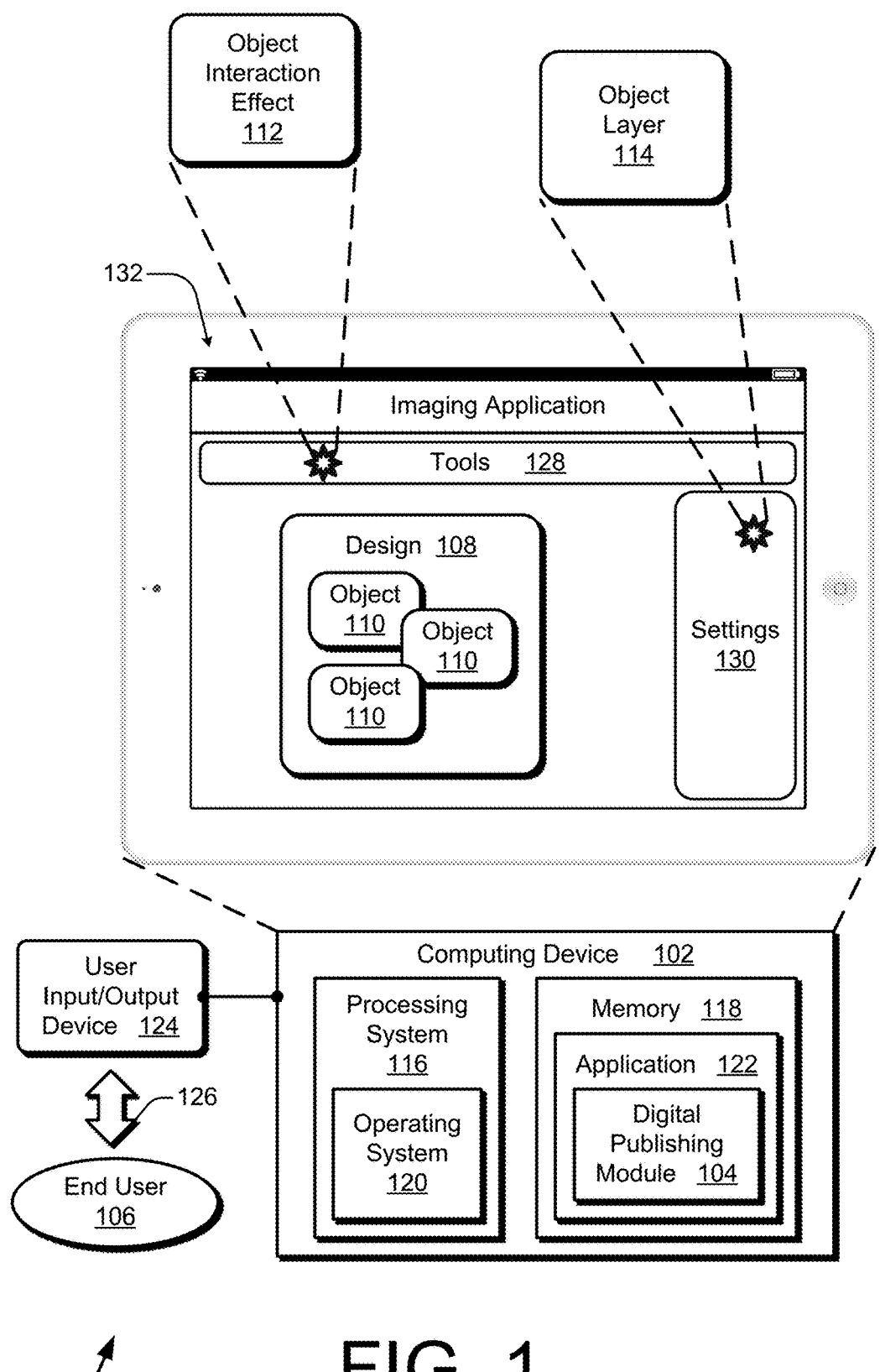
FIG. 1 illustrates an environment having a system for example embodiments that are operable to implement object interaction preservation from design to digital publication with a digital publishing module.

Conventional approaches to publishing a design via a digital channel fail to maintain the appearance of interactive objects in a manner that is effective for different electronic devices. If a design is converted into a single static image, the single static image cannot be reformatted for displays having different sizes or resolutions. If, on the other hand, a design flattener separates each portion of a design having a different appearance into a separate new piece for a digital publication, multiple issues result. First, the locations and boundaries of the original objects are lost, which hinders efforts to reproduce the original appearance of the design at a destination of a digital distribution channel Second, the number of pieces of a design can quickly multiply, which increases the number of hypertext markup language (HTML) document object model (DOM) elements to a degree that is difficult to manage. At the nexus of these two issues, a digital publication display application may be unable to stitch all these different pieces together in accordance with the original locations of the objects to preserve interactivity. In such cases, the interactivity may be completely omitted with conventional design publishing scenarios. Further, because the various original objects have lost their individual identities, the metadata and properties associated with the original objects are also lost. Consequently, no guidance on what properties should be inherited by newer objects survives a conventional digital publication process.

In contrast, object interaction preservation from design to digital publication is described herein on an object-by-object basis. A design includes overlapping objects with object interaction effects, such as transparency and blending modes. The design has a design document object model, which is referred to hereinafter as a "design DOM." The design DOM includes descriptions of the objects of the design. In example embodiments, a digital publishing module constructs a design DOM tree with each node having an object of the design DOM. The digital publishing module analyzes the design DOM tree to identify objects that interact with at least one overlapped object. Objects with dynamic content and objects with no overlapped object can be excluded from a set of identified objects. A bounding region of each identified object is investigated with regard to object layering data and object interaction attributes. Based on these layering and interaction aspects of the design, the digital publishing module prepares an object snapshot of the bounding region to reflect an appearance resulting from the interactive objects within the bounding region. The object snapshot is incorporated into a digital publication DOM tree while maintaining the object layering data of the design. Using this digital publication DOM tree, the digital publishing module produces a digital publication corresponding to the design. As a result, a digital publishing channel can replicate the appearance of the design using the object snapshots without needing to be able to apply any particular object interaction effects.

More specifically for some embodiments, the digital publishing module implements object interaction preservation during conversion of a design to a digital publication. The digital publishing module includes a design obtainment module, a DOM tree construction module, an object interaction analysis module, an object snapshot preparation module, an object snapshot incorporation module, and a digital publication production module. The design obtainment module accesses or creates a design including multiple objects, with at least one object overlapping at least one other object. Each object corresponds to a bounding region that maps to a spatial area of the design. For example, a bounding region can be implemented as a polygon, such as a rectangle, that contains a corresponding object. Alternatively, a bounding region can be implemented as a geometric shape that tracks the boundary shape of a corresponding object.

The design is associated with a document object model (DOM), or design DOM, that describes individual objects of the design as well as interrelationships between or among the various objects, including relative depth positions. Based on the design DOM, the DOM tree construction module constructs a design DOM tree having multiple nodes. Each object of the multiple objects of the design respectively corresponds to a node of the multiple nodes of the design DOM tree. The design DOM tree is constructed based on object interaction attributes of the objects of the design and object layering data indicative of in which layer each object is disposed.

The object interaction analysis module performs an object interaction analysis on each node of the multiple nodes of the design DOM tree to identify those objects that are to be earmarked for snapshot replication. For example, each object at each node of the design DOM tree is analyzed to ascertain if the object overlaps any other object and is associated with an object interaction effect. Examples of object interaction effects include transparency, opacity, blending, shadow, glow, feathering, group knockout, and combinations thereof. Each of these interaction effects may have "sub-effects" that allow for different types of the main effect. For instance, different types of blending include normal, multiplication, lighting, hue or saturation, difference, screen, combinations thereof, and so forth. Such identified objects are at risk for being improperly displayed with a digital publication absent application of the schemes and techniques described herein that utilize per-object snapshot replication. The object interaction analysis module thus identifies an object that is associated with an object interaction effect and that overlaps one or more other objects that are positioned below the identified object. This identified object is added to a set of identified objects that includes each of the objects identified for snapshot replication.

The object snapshot preparation module performs an appearance preparation on each object that is included in the identified object set. The object snapshot preparation module prepares an object snapshot for an identified object based on object layering data for the design and one or more object interaction attributes associated with the given object or bounding region within the design. The object layering data is indicative of the object layer in which each object is disposed. Thus, whether other objects lie under or over an identified object can be ascertained using the object layering data. The object interaction attribute is indicative of which one or more object interaction effects are associated with the identified object or other objects present within the bounding region corresponding to the identified object.

The object snapshot preparation module prepares the object snapshot for a bounding region corresponding to the identified object by pre-computing an appearance of the bounding region based on the identified object, on at least one object interaction effect associated with the identified object, on one or more overlapped objects that are below the identified object, and on any object interaction effects associated with the overlapped objects. The object snapshot thus replicates the appearance of the design within the bounding region by merging the appearance of the identified object with the appearance of the overlapped objects in a manner established by the object interaction attributes and the object layering data. The object snapshot can comprise a static image that is stored as, for example, a bitmapped file (e.g., a .jpg or .png file). An object snapshot is prepared for each of the objects in the identified object set.

The object snapshot incorporation module incorporates the object snapshots for the identified objects into a digital publication DOM tree. The digital publication DOM tree may be implemented to have a one-to-one nodal correspondence with the design DOM tree. Thus, if two of three total objects are identified for object appearance preparation during the object interaction analysis, each of the two objects of the design DOM tree are respectively replaced by one of two object snapshots. In other words, the object snapshot incorporation module incorporates an object snapshot by replacing the corresponding object at a node of the design DOM tree with the object snapshot at a corresponding node of the digital publication DOM tree.

The digital publication production module uses the digital publication DOM tree to create a digital publication DOM. From the digital publication DOM, the digital publication production module produces the digital publication. Continuing with the three-object design example, the digital publication includes one original object and two object snapshots. The digital publication production module produces the digital publication such that each object snapshot has an appearance that reflects the corresponding identified object as interactive with the one or more objects positioned under the object within the corresponding bounding region of the object in accordance with the one or more object interaction attributes of the design (e.g., in accordance with at least one object interaction effect associated with at least the identified object).

A digital publishing channel can therefore present the digital publication in a manner that replicates the appearance of the design using the object snapshots, including replicating the appearance resulting from the object interaction effects associated with various objects of the design. The object snapshots can be static and can replace original objects on an object-by-object basis. During the publication process as described herein, the original dimensions, location, and depth position of objects can be maintained to thereby preserve the interactivity applied to each object along with the corresponding appearance without generating new objects for the digital publication. Accordingly, the number of elements of an, e.g., HTML DOM can remain unchanged after the publication process. Moreover, the organization of a digital publication DOM of the digital publication can be similar to the design DOM of the originating design.

In the following discussion, after some example terminology is set forth, an example environment is described that may employ the techniques described herein. Example embodiment systems, apparatuses, and techniques are then described, followed by a section explaining example embodiment procedures. The procedures may be performed in the example environment and systems as well as in other environments and systems. However, performance of the example procedures is not limited to the example environment and systems, and the example environment and systems are not limited to performance of the example procedures.

Terminology Examples

Example descriptions or explanations of certain terms as used herein are set forth below. Each term is applicable to one or more, but not necessarily all, embodiments presented herein. Some terms are further elucidated using one or more examples.

A "digital medium environment" refers to a scenario or situation in which a computing device is operative to perform a process or a computing device includes hardware that is capable of performing some process. A digital medium environment also includes circuitry that is specially configured to achieve some goal or fulfill some purpose. Examples of a digital medium environment may include a server device that generates some output for an end user, a client device that accepts input and produces a result based thereon, a tablet computer that interfaces with a back-end database to provide marketing services, and combinations thereof.

A "design" refers to an electronically-realized combination of objects and other audio or visual items or various aspects thereof. A design is capable of human consumption via the senses, such as by viewing the design. Examples of designs include marketing materials, book illustrations, magazine spreads, viewable presentations, web pages, advertisements, application interfaces that are based on web technologies, and combinations thereof. A design can be created using a proprietary design application that offers features, such as those that affect a visual appearance of the design, that are not supported by widespread standards. A design includes one or more objects.

An "object" refers to an item that has a visually-discernable aspect. An object can be independently or separately manipulated, such as by being added, being deleted, being resized, being moved, having an appearance changed, and so forth. Examples of objects include shapes, textual elements, pictures, dynamic blocks with changing content (e.g., video), backgrounds, illustrations, and combinations thereof. Objects can be disposed in different layers of a design such that one object is positioned over or under another object from a depth perspective. An "overlapped object" refers to an object that has at least one spatially intersecting object on a higher layer such that the overlapped object is at least partially covered. An "overlapping object" refers to an object that spatially intersects another object that is on a lower layer such that the overlapping object at least partially covers the other object. "Overlapping objects" or "overlapping layered objects" can refer to multiple objects, each of which is an overlapping or an overlapped object.

An "interactive appearance" refers to two or more overlapping objects in which the visually-discernable aspect thereof depends on how the appearance of one object affects the appearance of another object based on an object interaction effect. An "object interaction effect" refers to a feature or specification for how one object can be affected by the appearance of an overlapped object. Examples of object interaction effects include transparency, opacity, blending, shadow, glow, feathering, group knockout, and combinations thereof. Each of these object interaction effects may include one or more "sub-effects" that allow for different types of the main effect. For instance, different types of blending include normal, multiplication, lighting, hue or saturation, difference, screen, and combinations thereof. An object interaction effect can be associated with a single object, a group of objects, or an area of a design.

A "digital publication" refers to a digital file or set of instructions that are packaged for distribution over one or more digital publication channels, such as the web or electronic books, that utilize one or more industry standards. Web-oriented formats can include, for instance, those that comport with a hypertext markup language (HTML)-based protocol. Book-oriented formats can include, for instance, those that comport with an electronic publication (EPUB) standard that uses an extensible markup language (XML)-based protocol. A digital publication may comport with a relatively universal standard that does not support all of the features of a proprietary design application. Both a design and a digital publication can have or be associated with a document object model (DOM) or a DOM tree.

A "DOM" refers to a programmatic entity that enables structured access to characteristics of individual objects and descriptions of how different objects interrelate to other objects of a design or digital publication. A DOM is an application interface that facilitates manipulation of the data of a document using a module. A "DOM tree" refers to a tree-like structure that can be used to represent the hierarchical aspects of a DOM. A DOM tree includes nodes and links between the nodes. The nodes and links jointly form structures that are analogous to the root, the branches, and the leaves of a tree. A "node" refers to a tree structure from which other nodes can branch. Each node can include data from the corresponding DOM. For example, each node of a DOM tree can correspond to an object of a design or digital publication.

A "bounding region" refers to a spatial area of a design or digital publication that corresponds to a planar location of an object of the design or digital publication, or to an object snapshot of a digital publication. A bounding region can be implemented as a polygon, such as a rectangle, that substantially contains a corresponding object or object snapshot. Alternatively, a bounding region can be implemented as a geometric shape that is dependent on one or more characteristics of the object (e.g., line segments or curves of the object) or on one or more object interaction attributes for the object, such as by tracking the boundary shape of a corresponding object or object snapshot. Thus, within the context of a bounding region, the spatial area of an object can encompass not only the interior and the stroked edges of the object, but also related visual effects that are applied to the object, such as shadow or halo.

An "appearance preparation" refers to an operation that pre-computes an appearance of at least part of at least two overlapping objects based on the individual appearances thereof in conjunction with at least one object interaction effect. The appearance preparation can apply the object interaction effect to the appearance of the two overlapping objects in accordance with a proprietary or non-universal feature or format. An appearance preparation can produce an object snapshot.

An "object snapshot" refers to a pre-computed appearance of an object having overlapped objects within a bounding region of the object as well as at least one object interaction effect. The object snapshot can be produced as a static item that is capable of being displayed or otherwise handled via a standard digital publication channel that may not know how to apply the object interaction effect. Example formats for object snapshots include a Joint Photographic Experts Group (JPEG) item (e.g., a ".jpg" file) and a Portable Networks Graphic (PNG) item (e.g., a ".png" file).

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this description.

Example Environment

FIG. 1 illustrates an environment having a system 100 for example embodiments that are operable to implement object interaction preservation from design to digital publication with a digital publishing module 104. As illustrated, the example system 100 includes at least one computing device 102 and at least one user input/output (I/O) device 124. The computing device 102 includes a processing system 116 and a memory 118. The processing system 116 includes an operating system 120. The memory 118 stores an application 122, which includes the digital publishing module 104. Example implementations for the computing device 102 and the digital publishing module 104 are described further below in this section. For the example environment, FIG. 1 depicts an end user 106 and a user interaction between the end user 106 and the user I/O device 124 that produces a user control signal 126. The environment further includes a design 108 having multiple objects 110.

As shown on a display screen associated with the computing device 102, the application 122 may be realized as a design application, such as a web design application or a graphic design application. The design application processes or displays objects 110 responsive to user input realized as the user control signal 126. For example, the design application empowers the end user 106 to add or delete objects, move objects in planar or depth directions, adjust characteristics of objects—such as the visual appearance of an object, or some combination thereof. Additionally, the digital publishing module 104 can publish a design 108 by converting the design 108 to a digital publication that is suitable for distribution using web formats or destinations, electronic publication formats or applications, combinations thereof, and so forth. Web formats can include, for instance, those that comport with a hypertext markup language (HTML)-based standard; electronic publication formats can include, for instance, those that comport with an EPUB standard that uses an extensible markup language (XML) protocol. In example operations, the digital publishing module 104 replaces an object 110 with an object snapshot that replicates an appearance of the design 108 with regard to a bounding region of the object 110, which technique is described below with reference to FIG. 2 and otherwise herein.

The computing device 102 provides a user interface 132 that presents output to the end user 106 or accepts input from the end user 106. To enable the end user 106 to manipulate the multiple objects 110 via the user interface 132, the design application provides a number of tools 128. Examples of tools 128 include a selection tool, a resizing or cropping tool, or a movement tool to move objects 110 along planar or depth directions. Tools 128 also include various object appearance tools, such as ones that enable application or adjustment of an object interaction effect 112. Examples of object interaction effects 112 include transparency, opacity, blending, shadow, glow, feathering, group knockout, and combinations thereof. An object interaction effect 112 can be associated with a single object 110 on an object-by-object basis or can be associated with multiple objects 110 on an object group basis.

To enable the end user 106 to easily see a current state of an individual object 110 or an overall aspect of the design 108, the design application displays a number of settings 130. Examples of settings 130 include a color palette, a selected font, a set of options for a currently-selected tool of the tools 128, an object interaction effect 112 that is associated with a currently-selected object 110, or an object layer 114. The design 108 can include multiple layers with one or more objects 110 disposed on each layer. Layering data is indicative of a depth positioning of a given object 110, which controls which object slides under or over another object when two objects are overlapped from a depth perspective. Although shown in the context of a device that enables touch-screen interaction, the tools 128, the settings 130, etc. of the design application can alternatively be utilized via a mouse, a touchpad, keyboard commands, voice interaction, or some combination thereof.

The computing device 102 can be implemented as any suitable type of computing device. Examples of end-user implementations for the computing device 102 include a desktop computer, a laptop or notebook computer, a mobile device (e.g., assuming a handheld configuration such as a mobile phone, a phablet, or a tablet—which is depicted in FIG. 1), a mobile device coupled to a separate screen, an entertainment appliance such as a smart television, a game console, a wearable computing device such as a smart watch or intelligent glasses, a virtual or augmented reality device, or some combination thereof. Thus, an end-user implementation of the computing device 102 may range from a relatively high-resource device with substantial memory and processor resources (e.g., a personal computer or game console) to a relatively low-resource device with constrained memory or processing resources (e.g., a mobile device such as a wearable computer). Examples of data center or server device implementations for the computing device 102 include a web server, a server running open source software, a server of a proprietary design, a stand-alone server, a server blade, an allocated portion of a server farm, server functionality that is distributed across at least one data center, cloud computing functionality, or some combination thereof.

The computing device 102 is illustrated as including a variety of hardware components: a processing system 116, an example of a computer-readable storage medium illustrated as memory 118, and so forth. Other hardware components are also contemplated as described herein with reference to FIG. 13. The processing system 116 is representative of functionality to perform operations through execution of instructions stored in the memory 118. Although illustrated as two separate components, functionality of the processing system 116 and the memory 118 may be combined into one component (e.g., on an application specific integrated circuit (ASIC) or as instructions are loaded from the memory onto a processor) or may be further divided into a greater number of components. Examples of a user I/O device 124 include a keyboard, a mouse, a touchpad, a touch screen, a microphone, a camera, a display device such as a screen or projector, a speaker, or some combination thereof. The user I/O device 124 may be separate from or integrated with the computing device 102. The computing device 102 is further illustrated as including an operating system 120. The operating system 120 is configured to abstract underlying hardware functionality of the computing device 102 to the application 122 that is executable on the computing device 102.

In example implementations, the digital publishing module 104 is located at or executing on the computing device 102, such as by being part of the application 122 or the operating system 120. The digital publishing module 104 represents functionality to implement schemes and techniques for object interaction preservation from design to digital publication as described herein. The digital publishing module 104 can be implemented as at least part of a software package that executes on and specially configures one or more processors, which processors may physically realize the processing system 116; as a hardware apparatus, which may be realized as an ASIC or as the computing device 102; or using a combination of software, firmware, hardware, or fixed logic circuitry; with some combination thereof; and so forth. As described herein with reference to FIG. 13, the digital publishing module 104 may be fully or partially implemented as a web or cloud-based design-oriented service.

Systems and Techniques

Figure 2:
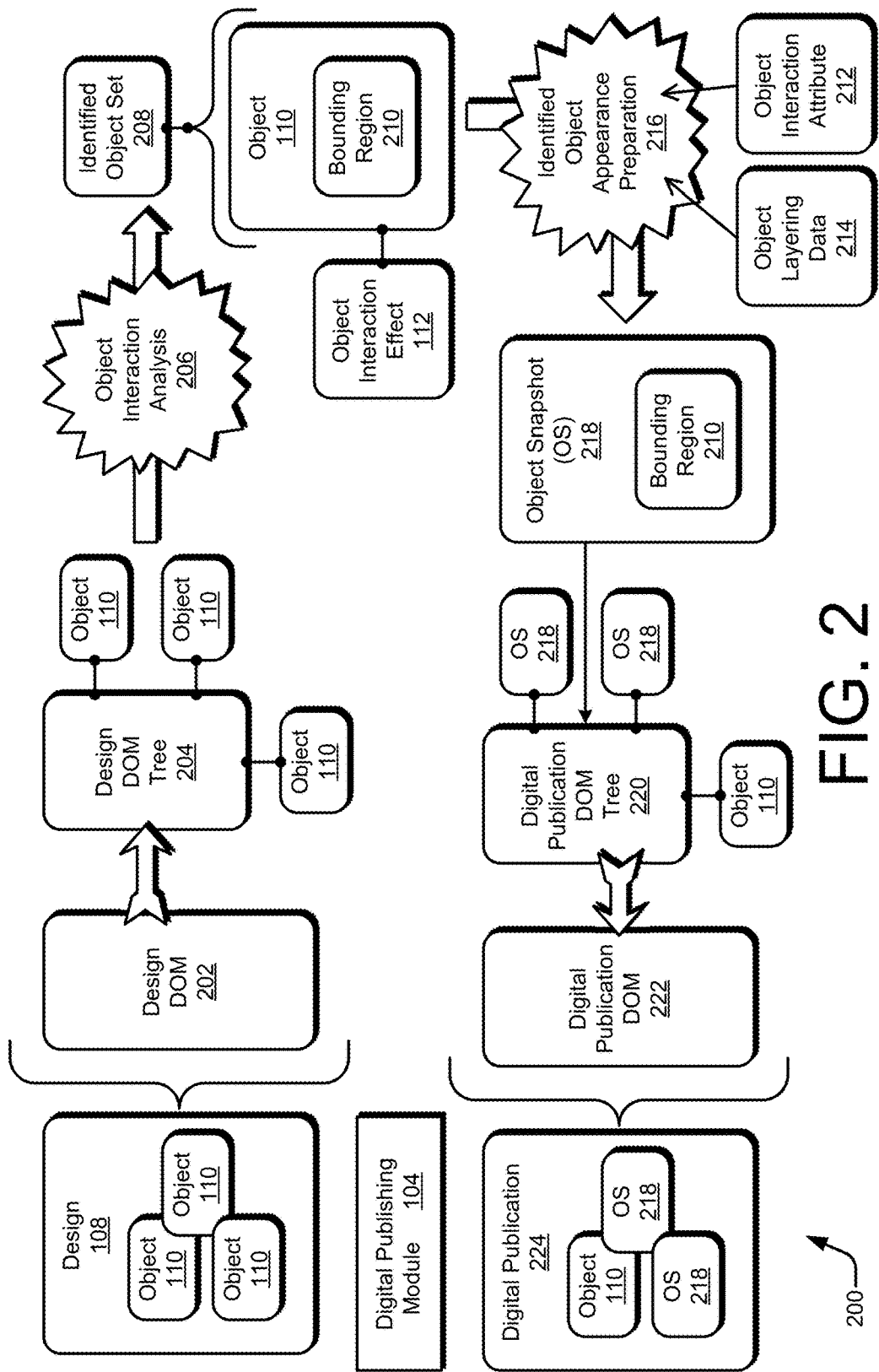
FIG. 2 illustrates an example scheme for object interaction preservation during conversion of a design to a digital publication using the digital publishing module.

FIG. 2 illustrates an example scheme 200 for object interaction preservation during conversion of a design 108 to a digital publication 224 using the digital publishing module 104. As shown, operation of the conversion starts with the design 108 at the top left corner of FIG. 2 and proceeds in a clockwise direction to the digital publication 224 in the bottom left corner. The design 108 includes multiple objects 110, with at least one object 110 overlapping another object 110. The design 108 has a document object model (DOM), which is referred to hereinafter as a "design DOM" 202. The digital publishing module 104 constructs a design DOM tree 204 having multiple nodes based on the design DOM 202. Each object 110 of the multiple objects 110 respectively corresponds to a node of the multiple nodes of the design DOM tree 204.

As indicated at the top right corner of FIG. 2, the digital publishing module 104 performs an object interaction analysis 206 on each node of the multiple nodes of the design DOM tree 204 to identify those objects that are appropriate for snapshot replication. Each object 110 at each node of the design DOM tree 204 is analyzed to ascertain if the object 110 overlaps any other object 110 and is associated with an object interaction effect 112. Such objects are at risk for being improperly displayed with a digital publication absent application of the schemes and techniques described herein that utilize per-object snapshot replication. The digital publishing module 104 thus identifies an object 110 that overlaps one or more other objects 110 that are positioned below the object 110 and that is associated with an object interaction effect 112. This object 110 is added to an identified set of objects 208 that includes each of the objects 110 identified for snapshot replication.

Each object 110 corresponds to a bounding region 210 that maps to an area of the design 108. For example, the bounding region 210 can be implemented as a geometric shape, such as a rectangle, that contains the corresponding object 110. Alternatively, the bounding region 210 can be implemented so as to track the boundary shape of the corresponding object 110. A bounding region 210 can include an indicator of a planar location of a region in the design 108 at which an object 110 is disposed and an indicator of a size of the region. For example, a rectangular bounding region 210 can include a coordinate (x,y) point of a corner of the rectangle, a width value, and a height value; a rectangular bounding region 210 can include coordinates for two points that are corners of the rectangle; or a circular bounding region 210 can include a center coordinate point and a radius value.

As indicated at the bottom right corner of FIG. 2, the digital publishing module 104 performs an appearance preparation 216 on each object 110 that is earmarked in the identified object set 208. The digital publishing module 104 prepares an object snapshot 218 for a given object 110 based on one or more object interaction attributes 212 associated with the given object 110 within the design 108 and on object layering data 214 for the design 108. The object layering data 214 is indicative of which object layer 114 (of FIG. 1) of the design 108 each object 110 is disposed. Thus, whether other objects lie under or over an identified object can be ascertained. The object interaction attribute 212 is indicative of which one or more object interaction effects 112 are associated with the identified object or other objects present within the bounding region 210.

The digital publishing module 104 prepares the object snapshot 218 for the bounding region 210 by pre-computing an appearance of the bounding region 210 based on the identified object, on at least one object interaction effect associated with the identified object, on one or more overlapped objects that are below the identified object, and on any object interaction effects associated with the overlapped objects. The object snapshot 218 thus replicates the appearance of the design 108 within the bounding region 210 by merging the appearance of the identified object with the appearance of the overlapped objects in a manner established by the object interaction attributes 212 and the object layering data 214. The object snapshot 218 comprises a static image that can be stored as, for example, a bitmapped file, such as a .jpg or .png file. An object snapshot 218 is prepared for each object 110 in the identified object set 208.

The digital publishing module 104 incorporates the object snapshot 218 into a digital publication DOM tree 220. The digital publication DOM tree 220 may be implemented to have a one-to-one nodal correspondence with the design DOM tree 204. In the illustrated example, two of the three objects 110 are identified for object appearance preparation at the object interaction analysis 206. Accordingly, each of two objects 110 of the design DOM tree 204 are respectively replaced by one of two object snapshots 218. Thus, the digital publishing module 104 incorporates an object snapshot 218 by replacing the corresponding object 110 at a node of the design DOM tree 204 with the object snapshot 218 at a corresponding node of the digital publication DOM tree 220.

The digital publication DOM tree 220 is used to create a digital publication DOM 222. From the digital publication DOM 222, the digital publishing module 104 produces the digital publication 224. As shown, the digital publication 224 includes an object 110 and two object snapshots 218. The digital publishing module 104 produces the digital publication 224 such that each object snapshot 218 has an appearance that reflects the identified object as interactive with the one or more objects positioned under the object within the bounding region 210 of the object in accordance with the one or more object interaction attributes 212 of the design 108 (e.g., in accordance with at least one object interaction effect 112 associated with the identified object). A digital publishing channel can therefore present the digital publication 224 in a manner that replicates the appearance of the design 108 using the object snapshots 218 and therefore without needing to explicitly implement the object interaction effects 112 associated with various objects 110 of the design 108.

Figure 3:
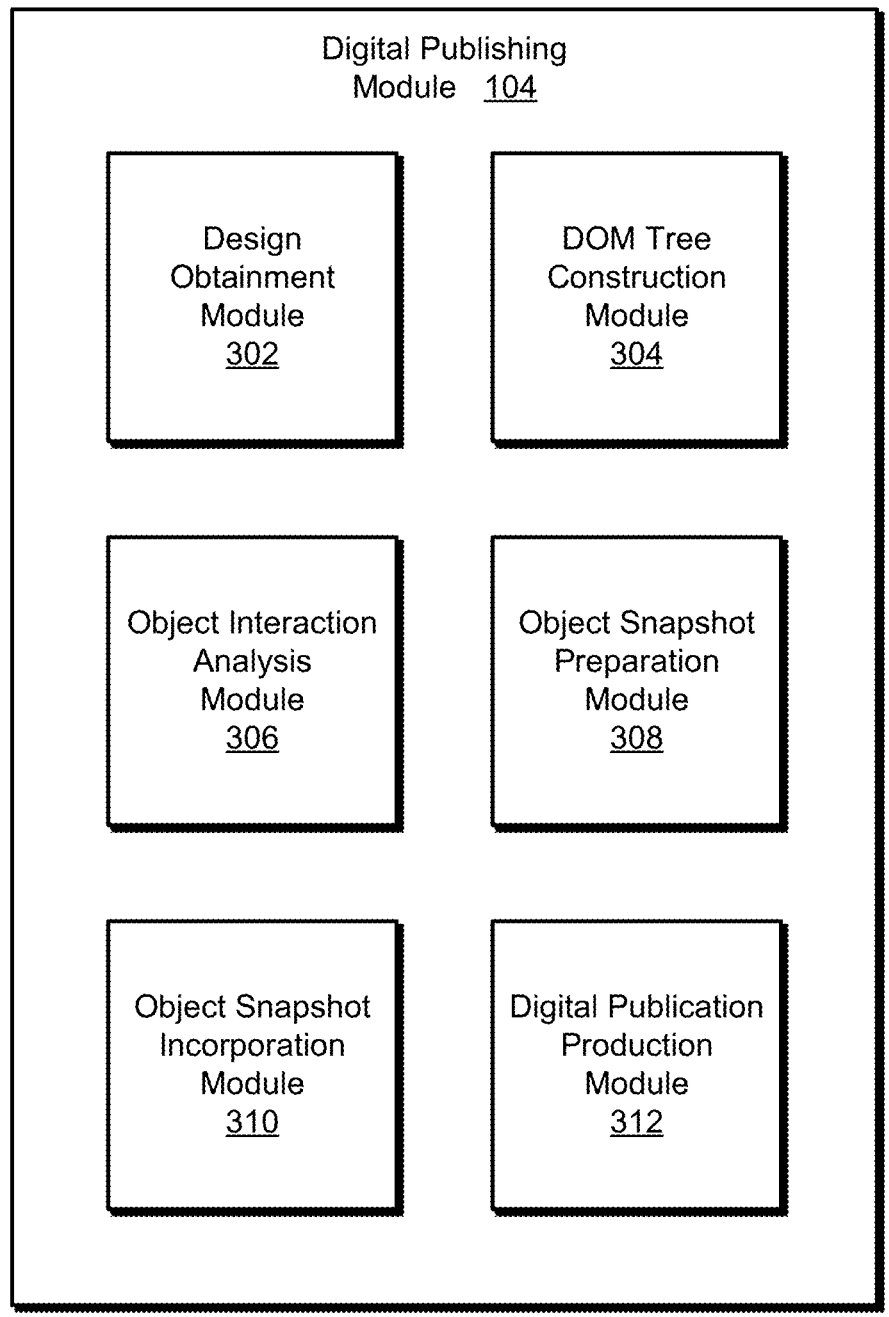
FIG. 3 is an example of a digital publishing module including a design obtainment module, a document object model (DOM) tree construction module, an object interaction analysis module, an object snapshot preparation module, an object snapshot incorporation module, and a digital publication production module.

FIG. 3 is an example of a digital publishing module 104 to implement the scheme 200 of FIG. 2. The digital publishing module 104 includes a design obtainment module 302, a DOM tree construction module 304, an object interaction analysis module 306, an object snapshot preparation module 308, an object snapshot incorporation module 310, and a digital publication production module 312. The design obtainment module 302 obtains a design 108, such as by accessing a locally-stored file having the design 108, receiving a file having the design 108 from a remote location, or creating the design 108 responsive to user input. An example of a design 108 is described herein with reference to FIG. 4.

The DOM tree construction module 304 constructs a design DOM tree 204 having multiple nodes that respectively correspond to multiple objects 110 of the design 108. The design DOM tree 204 is constructed based on the design DOM 202, which is associated with the design 108. An example of a design DOM tree 204 is described herein with reference to FIG. 5. The object interaction analysis module 306 identifies an object 110 in the design DOM tree 204 that is interactive with one or more objects 110 positioned under the object 110. The object 110 corresponds to a bounding region 210 that maps to a spatial area of the design 108 from a planar perspective. An example of an object interaction analysis is described herein with reference to FIG. 6.

The object snapshot preparation module 308 prepares an object snapshot 218 that replicates an appearance of the bounding region 210 in the design 108 based on the object 110, the one or more objects 110 positioned under the object 110, and an object interaction effect 112. Examples of preparing object snapshots 218 for different objects 110 and different bounding regions 210 thereof are described herein with reference to FIGS. 7A and 7B. The object snapshot incorporation module 310 incorporates the object snapshot 218 into a digital publication DOM tree 220. An example of a digital publication DOM tree 220 is described herein with reference to FIG. 8. The digital publication production module 312 produces a digital publication 224 based on the digital publication DOM tree 220. If the digital publishing module 104 is part of a design application, the digital publication production module 312 can export the digital publication 224 from the design application.

Figure 4:
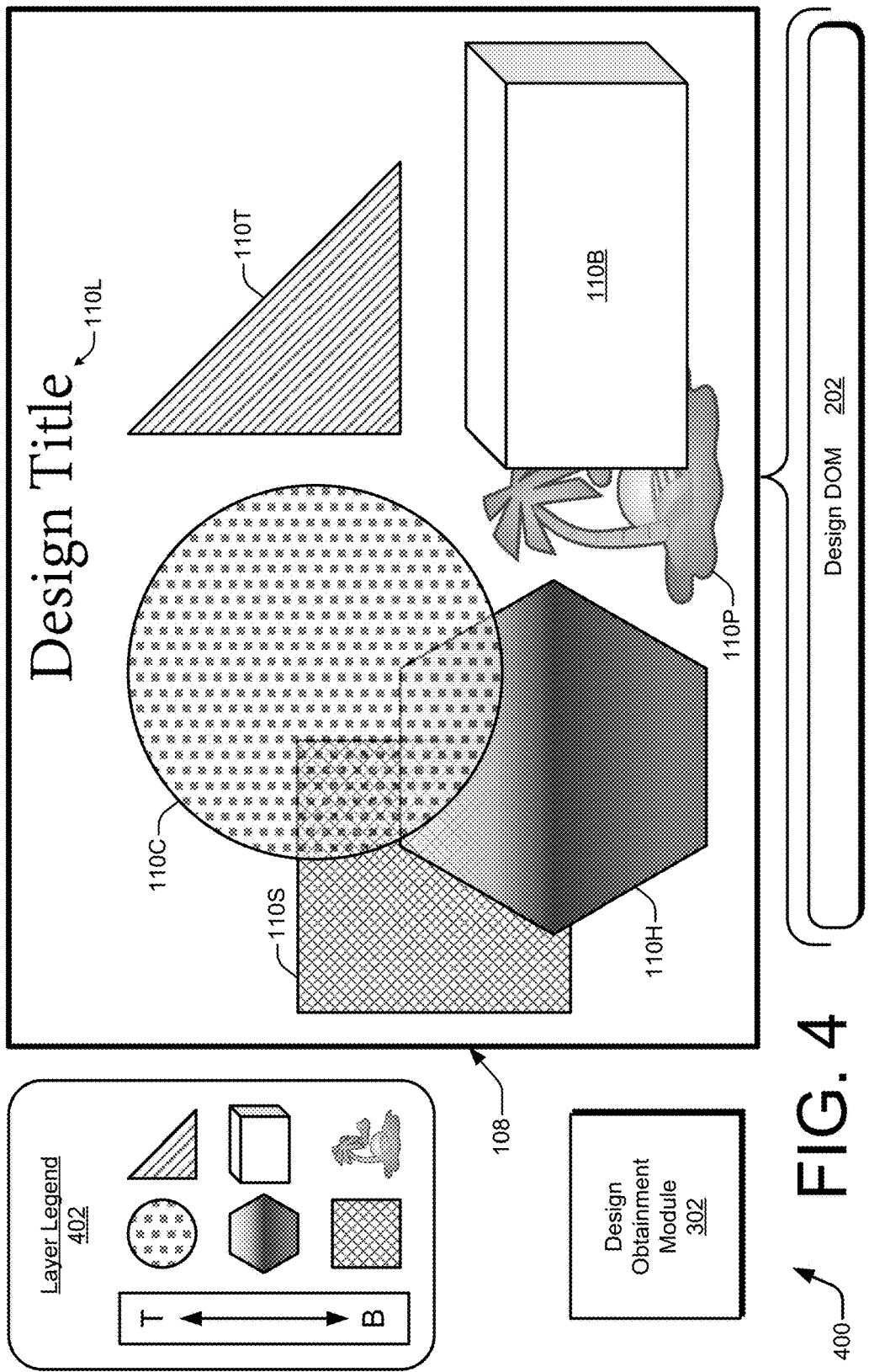
FIG. 4 depicts an example design having a design DOM and including multiple objects.

FIG. 4 depicts generally at 400 an example design 108 having a design DOM 202 and including multiple objects 110. As illustrated, the design 108 includes seven objects: a language object 110L that reads "Design Title," a triangle object 110T, a box object 110B, a picture object 110P, a hexagon object 110H, a square object 110S, and a circle object 110C. The design 108 may include more or fewer objects, but just seven objects are explicitly shown for the sake of clarity. The seven objects 110 are disposed across multiple different layers, which number three in this example. A layer legend 402 indicates in which of the three layers a given object is disposed—the bottom, middle, or top layer. The square object 110S and the picture object 110P are disposed in the bottom layer. The hexagon object 110H and the box object 110B are disposed in the middle layer. The circle object 110C and the triangle object 110T are disposed in the top layer. Although not specifically indicated, the language object 110L can be disposed in any layer, such as the top or bottom layer.

In operation, the design obtainment module 302 obtains the design 108 from a design application or obtains the design 108 by being part of the design application. By way of example, each of the different objects 110 represents some kind of object type. The language object 110L includes text. The picture object 110P is a static image like a photo in a bitmapped format, such as .JPG or .PNG. The box object 110B represents a dynamic object like a video or another item having changing or variable content. For instance, a box object may be realized as a graphics interchange format (GIF) item, a video such as a Moving Picture Experts Group (MPEG) item, a multiple state object, and so forth.

The other four objects are shapes provided by a design application. These four objects are the circle object 110C, the triangle object 110T, the hexagon object 110H, and the square object 110S. Each object has a different fill pattern. The circle object 110C has a light dotted fill, and the triangle object 110T has a dark diagonal line fill. The hexagon object 110H has a dark gradient fill, and the square object 110S has a medium cross-hatch fill. At least these four objects can be associated with an object interaction effect. For the sake of clarity, the circle object 110C and the hexagon object 110H have a transparency effect that reveals a portion of the appearance of any objects that are disposed below the objects in a lower layer of the design 108. However, a more complicated object interaction effect or a combination of multiple object interaction effects can be implemented.

Figure 5:
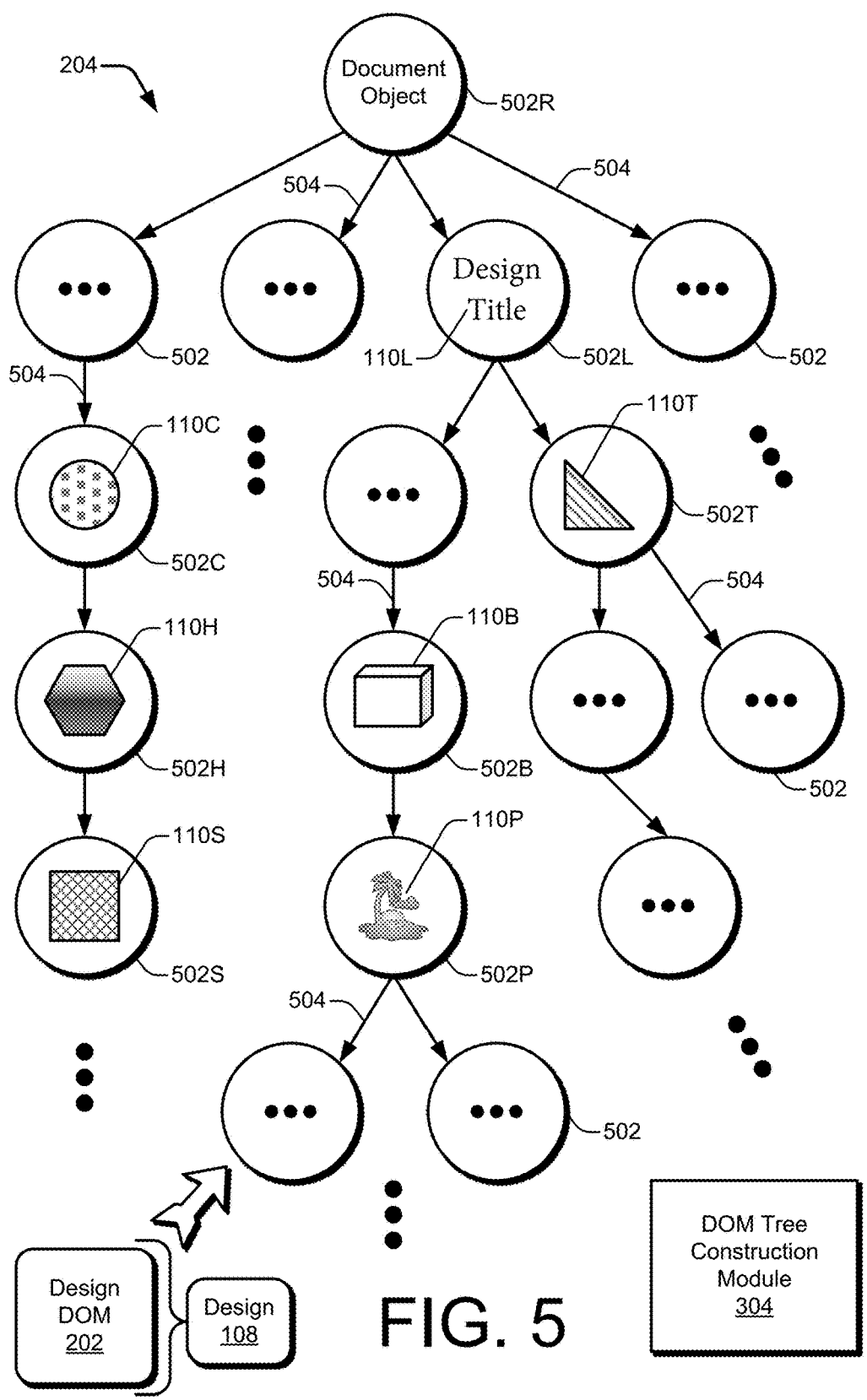
FIG. 5 depicts an example design DOM tree that is constructed from the design DOM so as to include the multiple objects of the design.

FIG. 5 depicts an example design DOM tree 204 that is constructed from the design DOM 202 so as to include the multiple objects 110 of the design 108. The DOM tree construction module 304 constructs the design DOM tree 204 by including a respective node 502 for each object 110 of the design 108 (e.g., of FIG. 4) via the design DOM 202. As illustrated, the design DOM tree 204 includes multiple nodes 502 that are connected via links 504 to form branches, leaves, etc. of the design DOM tree 204. The nodes 502 are represented by circles, and the links 504 are represented by arrows. Although some of the nodes 502 and links 504 are indicated by reference numbers, reference numbers are omitted from other nodes and links for the sake of clarity.

In example embodiments, the design DOM tree 204 includes a root node 502R that is referred to as the document object node. The illustrated nodes 502 include seven nodes that respectively correspond to the seven objects 110 explicitly shown in FIG. 4 as well as other nodes that respectively correspond to objects that are not depicted in FIG. 4. These other nodes 502 are indicated by ellipses in the circles of FIG. 5. The seven objects 110 depicted in FIG. 4 have corresponding nodes as follows. The language object 110L corresponds to a language node 502L. The circle object 110C corresponds to a circle node 502C, and the triangle object 110T corresponds to a triangle node 502T. The hexagon object 110H corresponds to a hexagon node 502H, and the box object 110B corresponds to a box node 502B. The square object 110S corresponds to a square node 502S, and the picture object 110P corresponds to a picture node 502P.

The design DOM tree 204 is structured responsive to interrelationships between or among different objects 110 as specified by the design DOM 202. In an example implementation, objects (e.g., the circle object 110C and the triangle object 110T) that are disposed in a same layer of the design 108 are placed at a same depth of the design DOM tree 204. An object (e.g., the circle object 110C) that overlaps other objects (e.g., the hexagon object 110H and the square object 110S) and that is disposed in an upper layer of the design 108 is placed at a higher depth along the same branch of the design DOM tree 204 as are the overlapped objects. However, this simplified approach to constructing a design DOM tree 204 is shown for visual clarity, and other approaches may alternatively be implemented.

Figure 6:
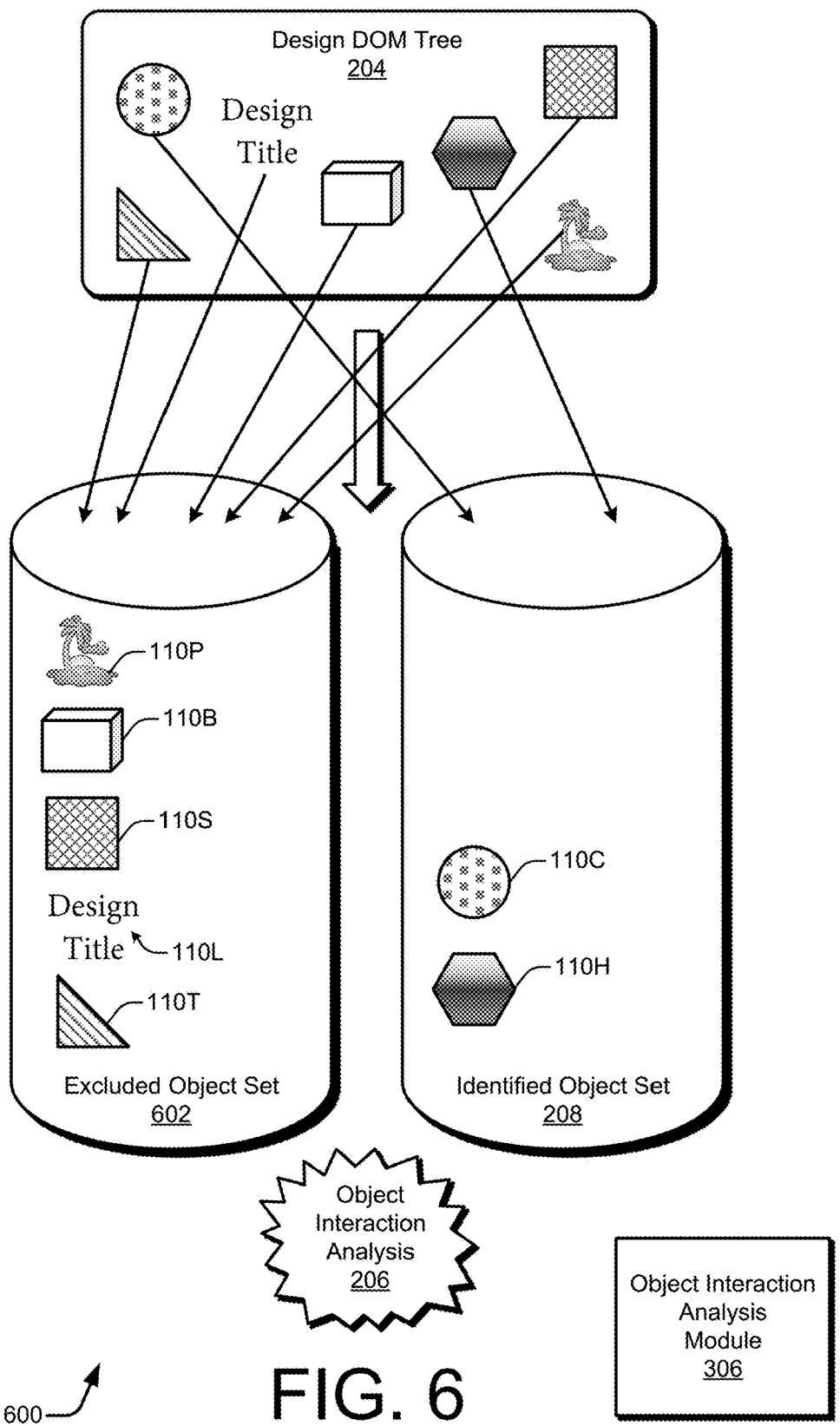
FIG. 6 illustrates an example object interaction analysis applied to the multiple objects of the design DOM tree.

FIG. 6 illustrates generally at 600 an example object interaction analysis 206 applied to the multiple objects 110 of the design DOM tree 204. A simplified representation of the design DOM tree 204 is depicted at the top of FIG. 6. Two object sets are depicted below: an excluded object set 602 and the identified object set 208. In an example operation, the object interaction analysis module 306 traverses the design DOM tree 204 and assigns each object 110 to the identified object set 208 or the excluded object set 602 based on the design aspects encoded into the design DOM tree 204. As shown, the circle object 110C and the hexagon object 110H are assigned to the identified object set 208. Each of the circle object 110C and the hexagon object 110H are associated with at least one object interaction effect (e.g., some kind of transparency) and are positioned above at least one other object so as to at least partially overlap the other object. Thus, these objects are identified for object snapshot preparation, which is described below with reference to FIGS. 7A and 7B. In an alternative implementation, objects with these characteristics can be excluded from object snapshot preparation if a particular associated object interaction effect is known to be supported by a standard format or protocol of a targeted digital publication channel.

Each of the excluded objects of the excluded object set 602 is excluded from the identified object set 208 for one or more reasons, as is evident with reference also to FIG. 4. The picture object 110P and the square object 110S are excluded because each is at the bottom-most layer of objects. Hence, neither can overlap any other objects, even though both intersect with another object in the plane of the design 108. The box object 110B is excluded because the box object 110B has dynamic content with a dynamic appearance that cannot be captured with a static snapshot. The language object 110L and the triangle object 110T are not identified for snapshot replication, even though neither is on the bottom-most layer of objects, because neither intersects with another object across the plane of the design 108.

Figure 7B:
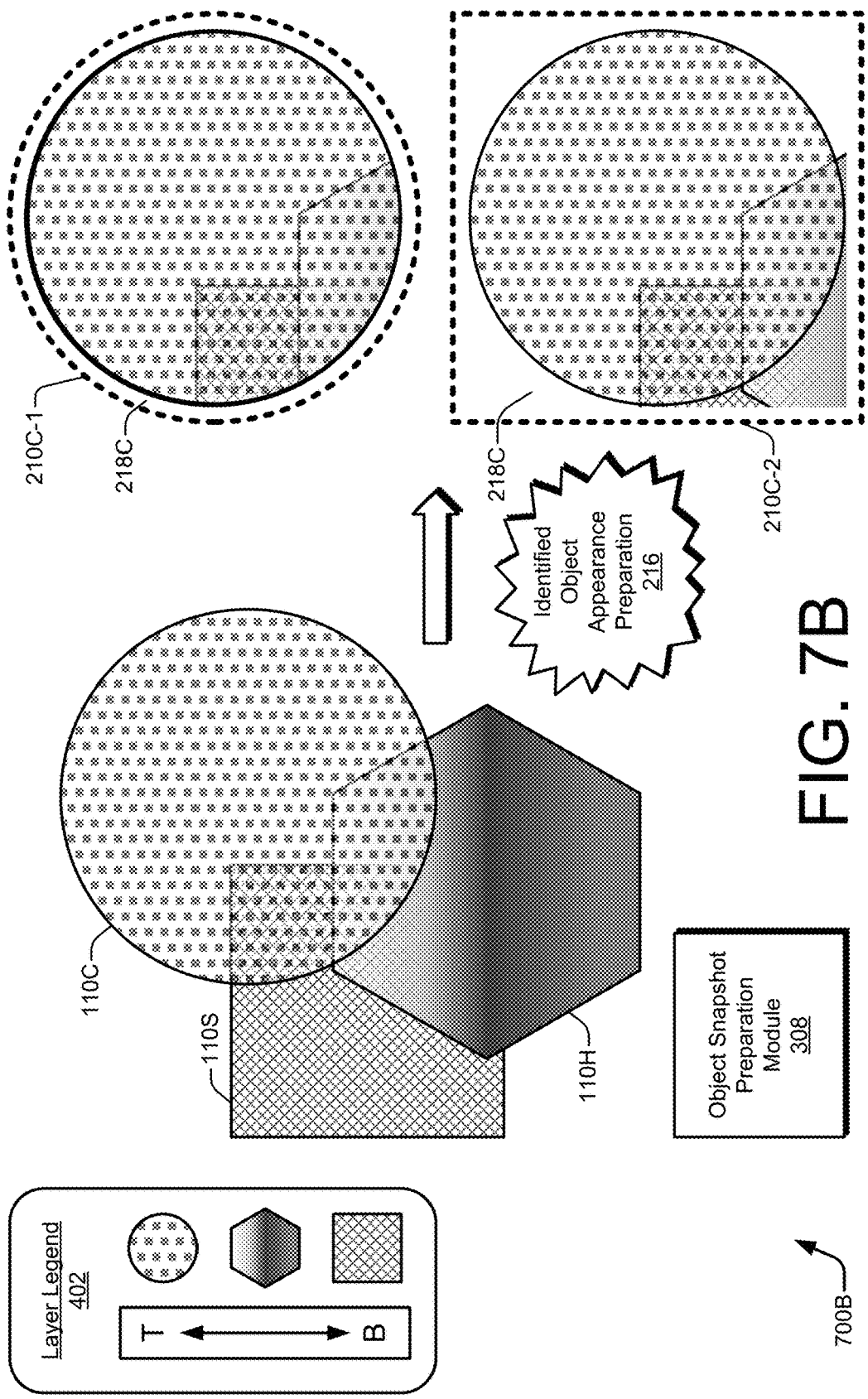

FIGS. 7A and 7B illustrate an example of object snapshot preparation 700A and 700B, respectively, for two interactive objects of the design 108. Both FIGS. 7A and 7B include a layer legend 402 that indicates the relative depth positioning from top to bottom of the circle object 110C, the hexagon object 110H, and the square object 110S. In each object snapshot preparation 700A and 700B, the object snapshot preparation module 308 performs an identified object appearance preparation 216. The object snapshot preparation 700A pertains to the hexagon object 110H, and the object snapshot preparation 700B pertains to the circle object 110C.

In the object snapshot preparation 700A of FIG. 7A, the object snapshot preparation module 308 prepares a hexagon object snapshot 218H that replicates the appearance of the hexagon object 110H in a hexagon bounding region 210H. Two example bounding region implementations are shown in FIG. 7A. In the top right corner, a hexagon bounding region 210H-1 tracks the shape of the hexagon object 110H. Thus, the hexagon bounding region 210H-1 has a hexagonal in shape. In the bottom right corner, a hexagon bounding region 210H-2 conforms to a selected polygon shape that contains the hexagon object 110H. A rectangle, for instance, can be used as the selected polygon shape because the dimensions of a rectangle facilitate translation to display coordinates for a spatial area of a design, along with the processing thereof. Although the thick dashed boundary of both hexagon bounding regions 210H are shown spaced-apart from the corresponding pixels for the sake of clarity, the boundaries thereof may alternatively be closer to, further from, or aligned with the boundaries of the corresponding pixels, whether the pixels are confined to the border of the hexagon object 110H (e.g., as for the hexagon bounding region 210H-1) or extend beyond the border of the hexagon object 110H (e.g., as for the hexagon bounding region 210H-2).

The object snapshot preparation module 308 prepares the hexagon object snapshot 218H based on an appearance of the hexagon object 110H, an appearance of the overlapped square object 110S, and the at least one object interaction effect, which is a transparency visual effect here. Accordingly, the square object 110S is at least partially visible "underneath" the hexagon object 110H in the hexagon object snapshots 218H. This partial visibility due to the transparency visual effect is discernable in the hexagon object snapshots 218H as illustrated in FIG. 7A. For the hexagon bounding region 210H-2 that extends beyond the border of the hexagon object 110H, part of the square object 110S that is not covered by the hexagon object 110H but that is present within the hexagon bounding region 210H-2 is also visually discernable.

In the object snapshot preparation 700B of FIG. 7B, the object snapshot preparation module 308 prepares a circle object snapshot 218C that replicates the appearance of the circle object 110C in a circle bounding region 210C. Two example bounding region implementations are shown in FIG. 7B. In the top right corner, a circle bounding region 210C-1 tracks the shape of the circle object 110C. Thus, the circle bounding region 210C-1 has a circular in shape. In the bottom right corner, a circle bounding region 210C-2 conforms to a selected polygon shape that contains the circle object 110C. A rectangle is used as the selected polygon shape in FIG. 7B. Although the thick dashed boundary of both circle bounding regions 210C are shown spaced-apart from the corresponding pixels for the sake of clarity, the boundaries thereof may alternatively be closer to, further from, or aligned with the boundaries of the corresponding pixels, whether the pixels are confined to the border of the circle object 110C (e.g., as for the circle bounding region 210C-1) or extend beyond the border of the circle object 110C (e.g., as for the circle bounding region 210C-2).

The object snapshot preparation module 308 prepares the circle object snapshot 218C based on an appearance of the circle object 110C, an appearance of the overlapped hexagon object 110H, an appearance of the overlapped square object 110S, and the at least one object interaction effect, which is a transparency visual effect here. In this example, the transparency interaction effect is associated with, and applied to, both the circle object 110C and the hexagon object 110H. Accordingly, in addition to the square object 110S being at least partially visible "underneath" the hexagon object 110H, both the square object 110S and the hexagon object 110H are at least partially visible "underneath" the circle object 110C in the circle object snapshots 218C. This partial visibility due to the transparency visual effects are discernable in the circle object snapshots 218C as illustrated in FIG. 7B. For the circle bounding region 210C-2 that extends beyond the border of the circle object 110C, parts of both the square object 110S and the hexagon object 110H that are not covered by the circle object 110C but that are present within the circle bounding region 210C-2 are also visually discernable.

Figure 8:
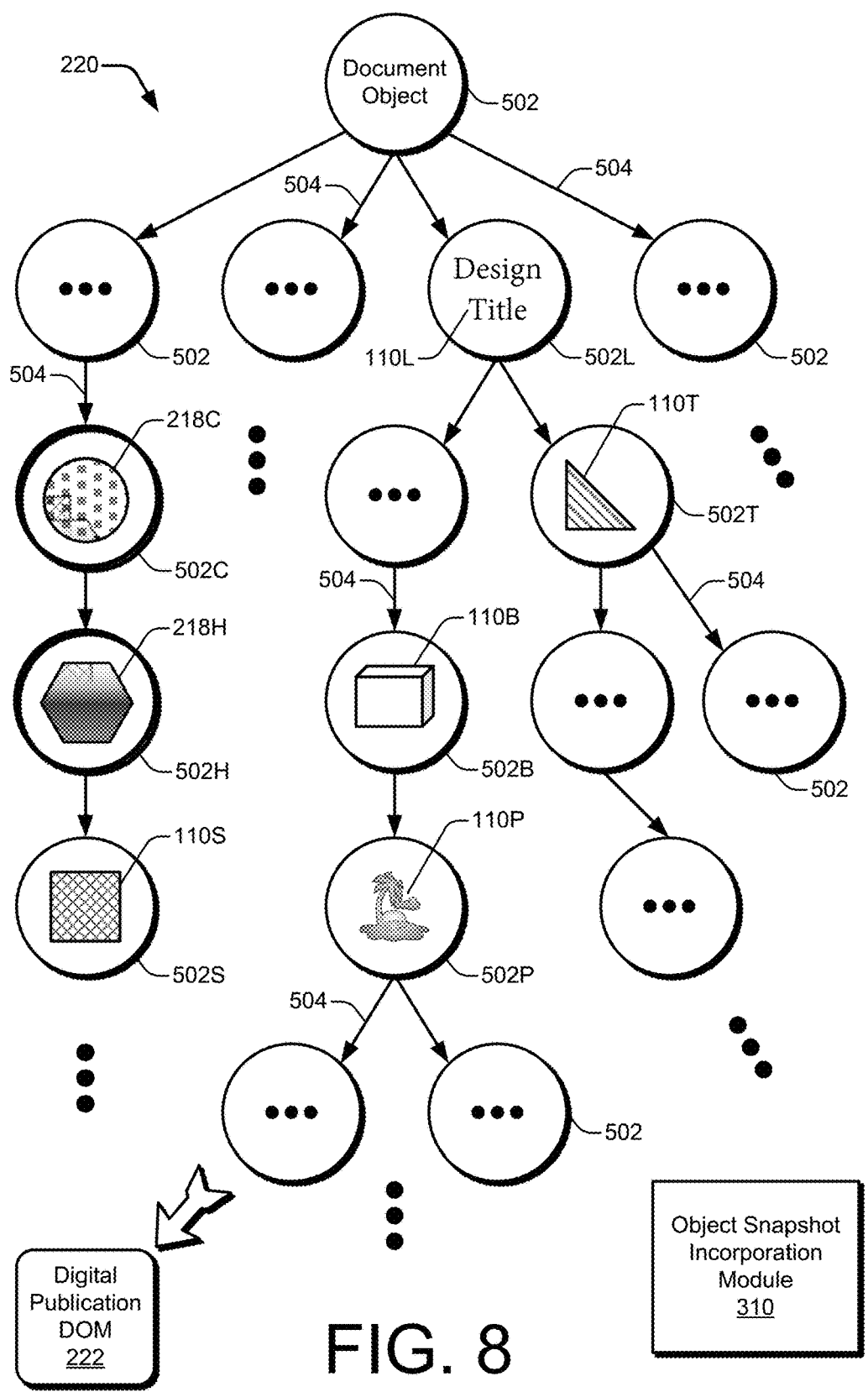
FIG. 8 depicts an example digital publication DOM tree that is derived from the design DOM tree responsive to the prepared object snapshots.

FIG. 8 depicts an example digital publication DOM tree 220 that is derived from the design DOM tree 204 (e.g., of FIG. 5) responsive to the prepared object snapshots 218. The digital publication DOM tree 220 includes multiple nodes 502 and multiple links 504 that interconnect the nodes 502 to form the tree-like data structure. In some embodiments, the digital publication DOM tree 220 is structured analogously to the design DOM tree 204. For example, the nodes 502 and the links 504 of the design DOM tree 204 can have a one-to-one correspondence with the nodes 502 and the links 504 of the digital publication DOM tree 220. In such cases, the digital publication DOM tree 220 can be structured so as to be no more complex than the design DOM tree 204. Furthermore, the objects 110 and the object snapshots 218 of the digital publication DOM tree 220 can be reflowed to display the overall design 108 responsive to a size and resolution of a display device in manners analogous to those for the objects 110 of the design DOM tree 204.

As described above with reference to FIG. 6, the object interaction analysis module 306 adds the hexagon object 110H and the circle object 110C to the identified object set 208 as being identified for appearance preparation. As described above with reference to FIGS. 7A and 7B, the object snapshot preparation module 308 prepares the hexagon object snapshot 218H based on the hexagon bounding region 210H corresponding to the hexagon object 110H and the circle object snapshot 218C based on the circle bounding region 210C corresponding to the circle object HOC.

As shown in FIG. 8, the object snapshot incorporation module 310 incorporates the object snapshots 218 into the digital publication DOM tree 220. In example implementations, the object snapshot incorporation module 310 incorporates object snapshots 218 by replacing a particular object 110 at a node 502 of the design DOM tree 204 with an object snapshot 218 derived for the particular object 110 at a corresponding node 502 of the digital publication DOM tree 220. For instance, the hexagon object 110H at the hexagon node 502H of the design DOM tree 204 (of FIG. 5) is replaced by the hexagon object snapshot 218H at the hexagon node 502H of the digital publication DOM tree 220. Also, the circle object snapshot 218C replaces the circle object 110C at the circle node 502C for the digital publication DOM tree 220. A digital publication channel application, such as a web browser or an eBook app, can therefore display the hexagon object snapshot 218H instead of the hexagon object 110H and the circle object snapshot 218C instead of the circle object 110C.

Figure 9A:
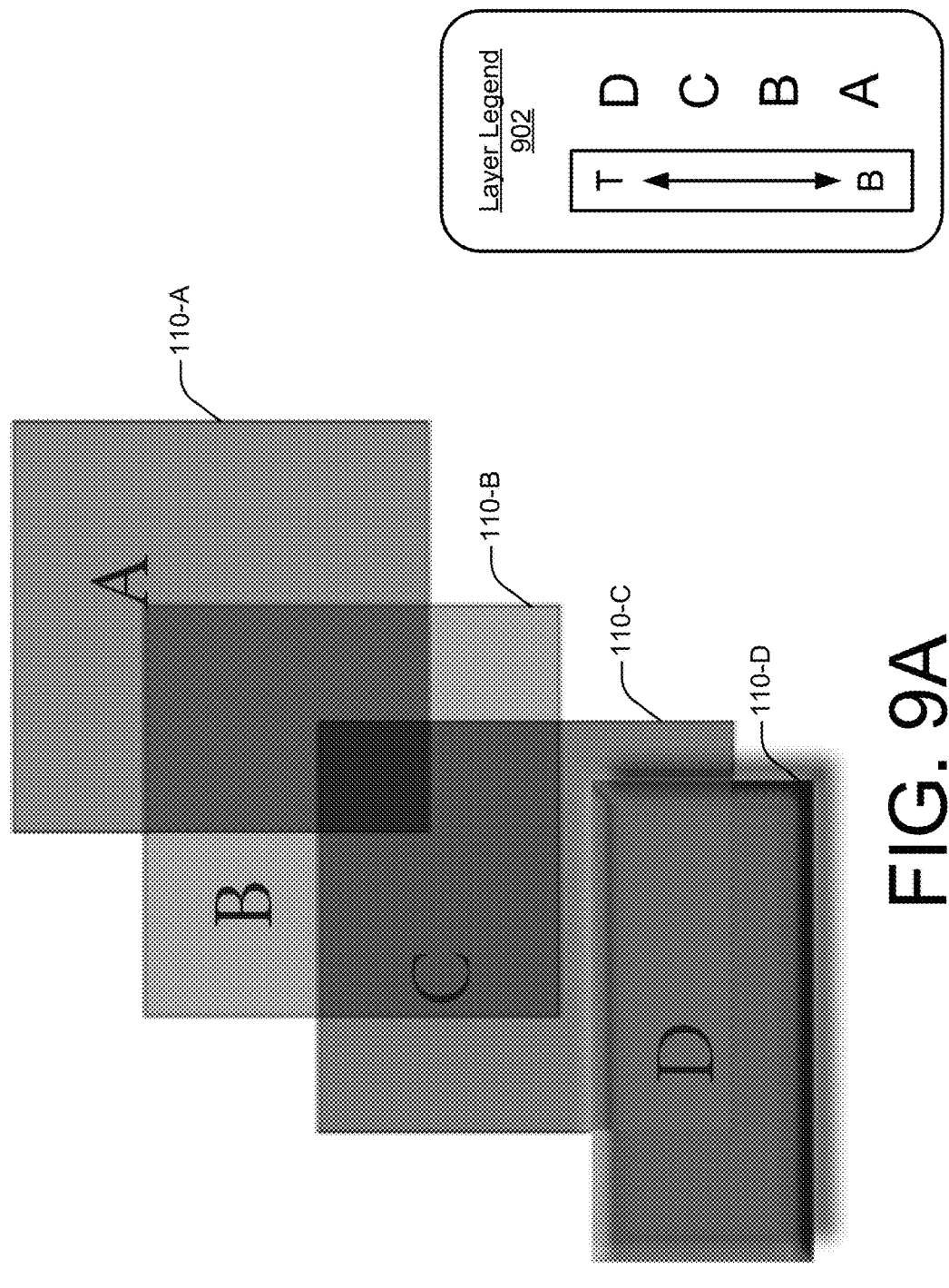
FIGS. 9A, 9B, and 9C depict an example of a design having four overlapping objects that are associated with object interaction effects and three object snapshots that are prepared to facilitate digital publication of the design.
Figure 9B:
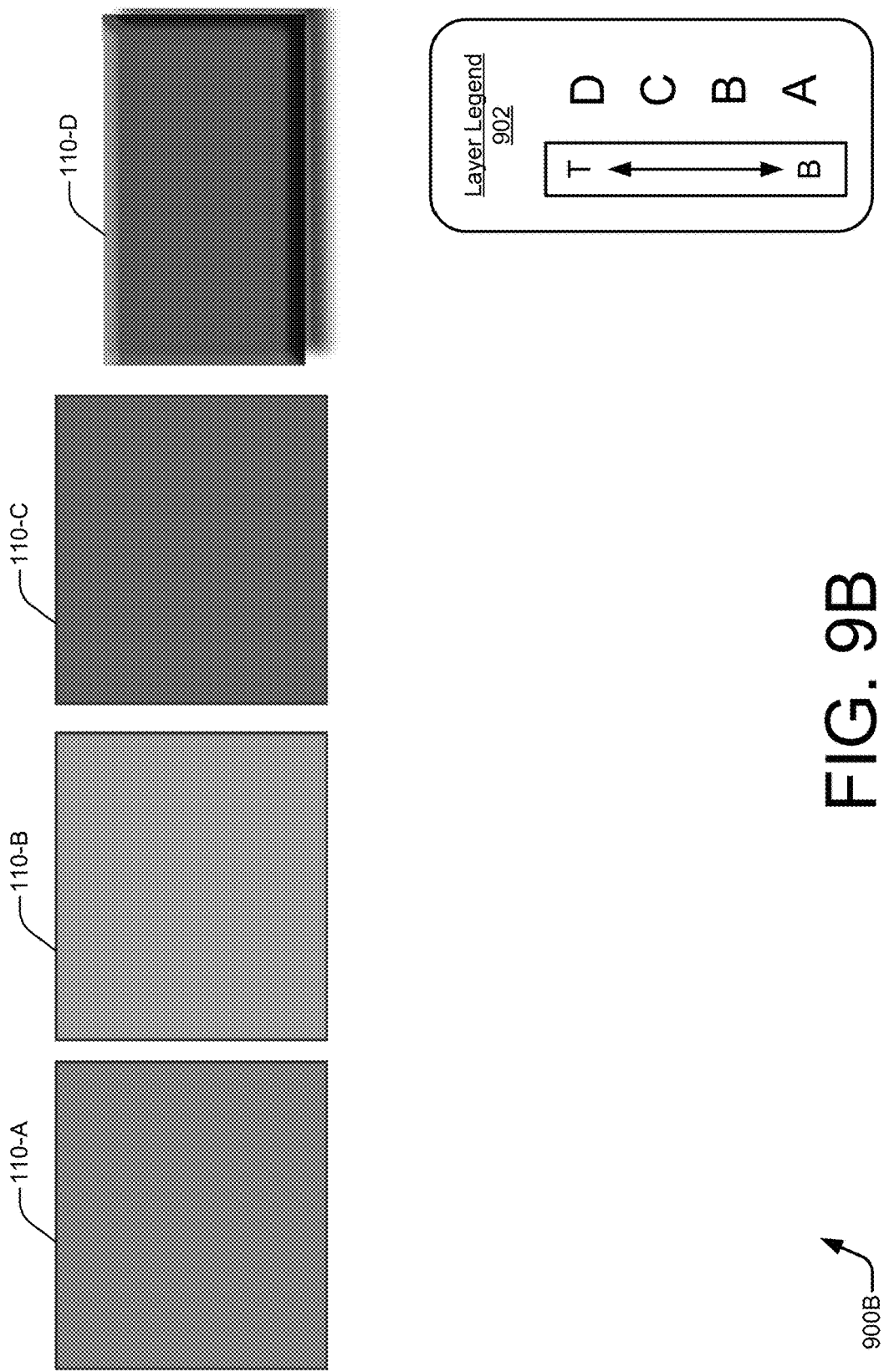
Figure 9C:
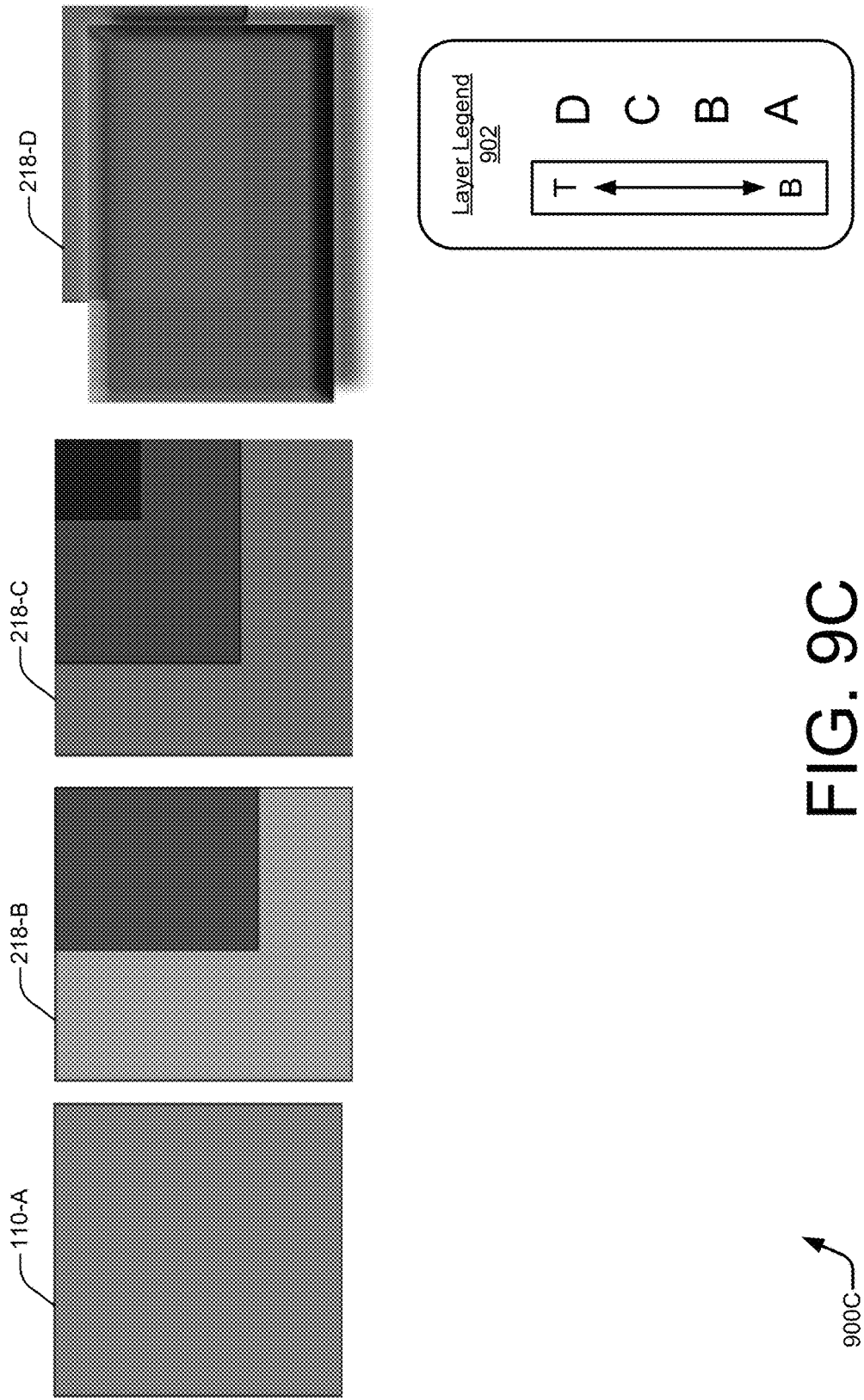

FIGS. 9A, 9B, and 9C depict an example of a design 108' having four overlapping objects 110 that are associated with object interaction effects. A layer legend 902 indicates a relative depth ordering of the objects from top to bottom. Three object snapshots 218 are prepared to facilitate digital publication of the design 108'. In FIG. 9A, the design 108' is shown to include four objects 110-A, 110-B, 110-C, and 110-D. The four objects are stacked over one another in an overlapping manner. As indicated by the layer legend 902, the ordering of the four objects from top to bottom is: object 110-D, object 110-C, object 110-B, and object 110-A. The objects 110 of the design 108' have two object interaction effects applied to them. These two object interaction effects are transparency at a 50% level and a blending mode of multiply.

In FIG. 9B, the four objects 110 are shown separate from one another generally at 900B. From left to right, the four objects 110-A, 110-B, 110-C, and 110-D are therefore depicted without being affected by any object interaction effect. In FIG. 9C, processing results are shown generally at 900C. Specifically, the results of the four objects 110 being subjected to an object interaction analysis 206 (e.g., of FIGS. 2 and 6) and an identified object appearance preparation 216 (e.g., of FIGS. 2, 7A, and 7B) are shown. Because the object 110-A does not overlap any objects in the design 108', the object 110-A is excluded from object appearance preparation. The other three objects, however, are identified for object appearance preparation. The object snapshot 218-B is prepared for the object 110-B, the object snapshot 218-C is prepared for the object 110-C, and the object snapshot 218-D is prepared for the object 110-D.

From the depiction of the object snapshot 218-B, it is apparent that the object snapshot 218-B reflects the appearance of the object 110-B as affected by the appearance of the overlapped object 110-A, in conjunction with the two object interaction effects. From the depiction of the object snapshot 218-C, it is apparent that the object snapshot 218-C reflects the appearance of the object 110-C as affected by the appearances of the overlapped objects 110-A and 110-B, in conjunction with the two object interaction effects. From the depiction of the object snapshot 218-D, it is apparent that the object snapshot 218-D reflects the appearance of the object 110-D as affected by the appearance of the overlapped object 110-C, again in conjunction with the two object interaction effects. In this example implementation, each object snapshot 218 is unaffected by objects that are in higher layers to maintain the object layering data of the design 108'. However, an alternative implementation may be utilized.

Having discussed example details of systems, techniques, and schemes for object interaction preservation from design to digital publication, consider now some example procedures to illustrate additional aspects of the techniques.

Example Procedures

Figure 10:
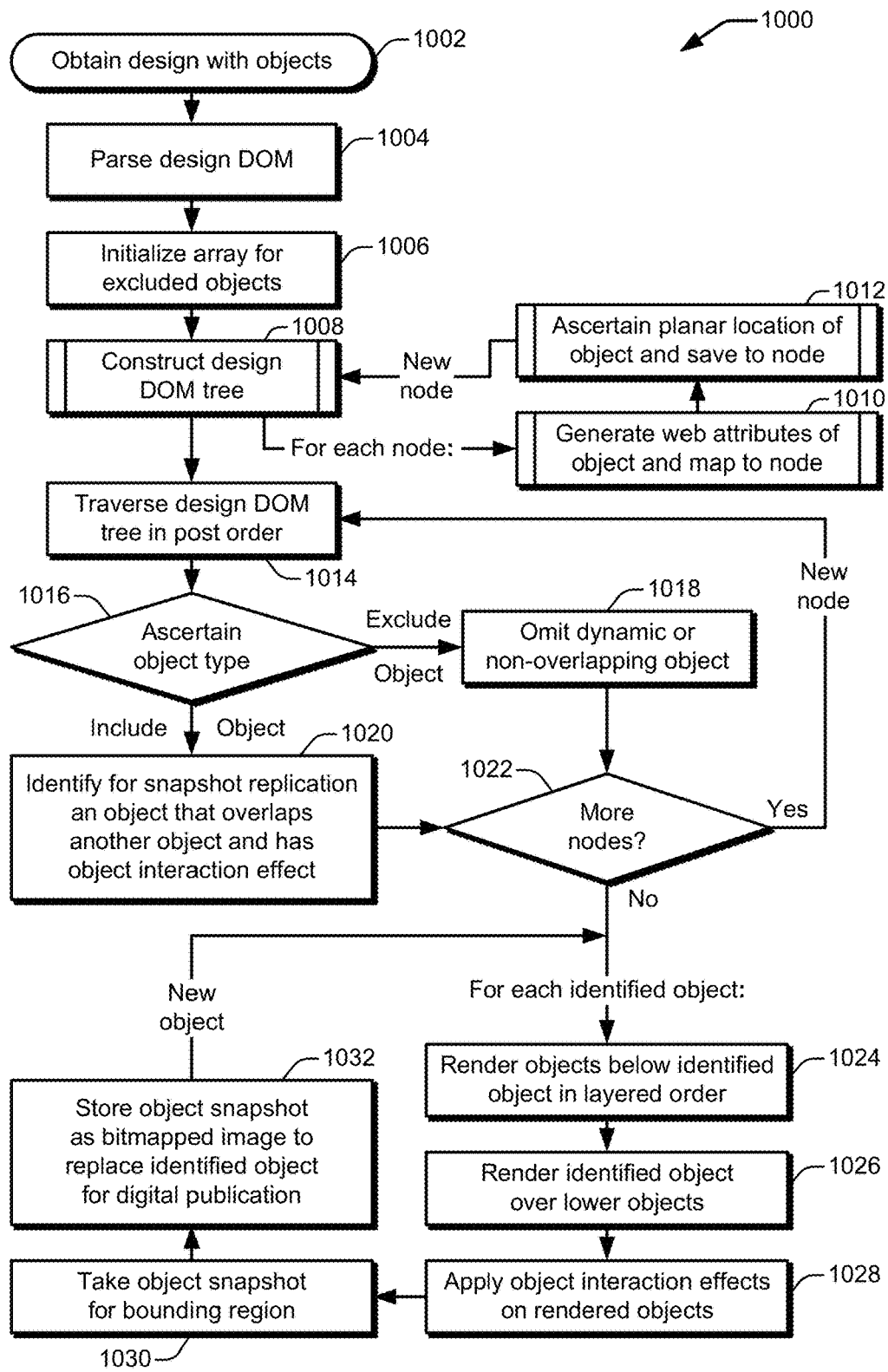
FIG. 10 is a flow chart illustrating an example procedure in accordance with one or more example embodiments.
Figure 11:
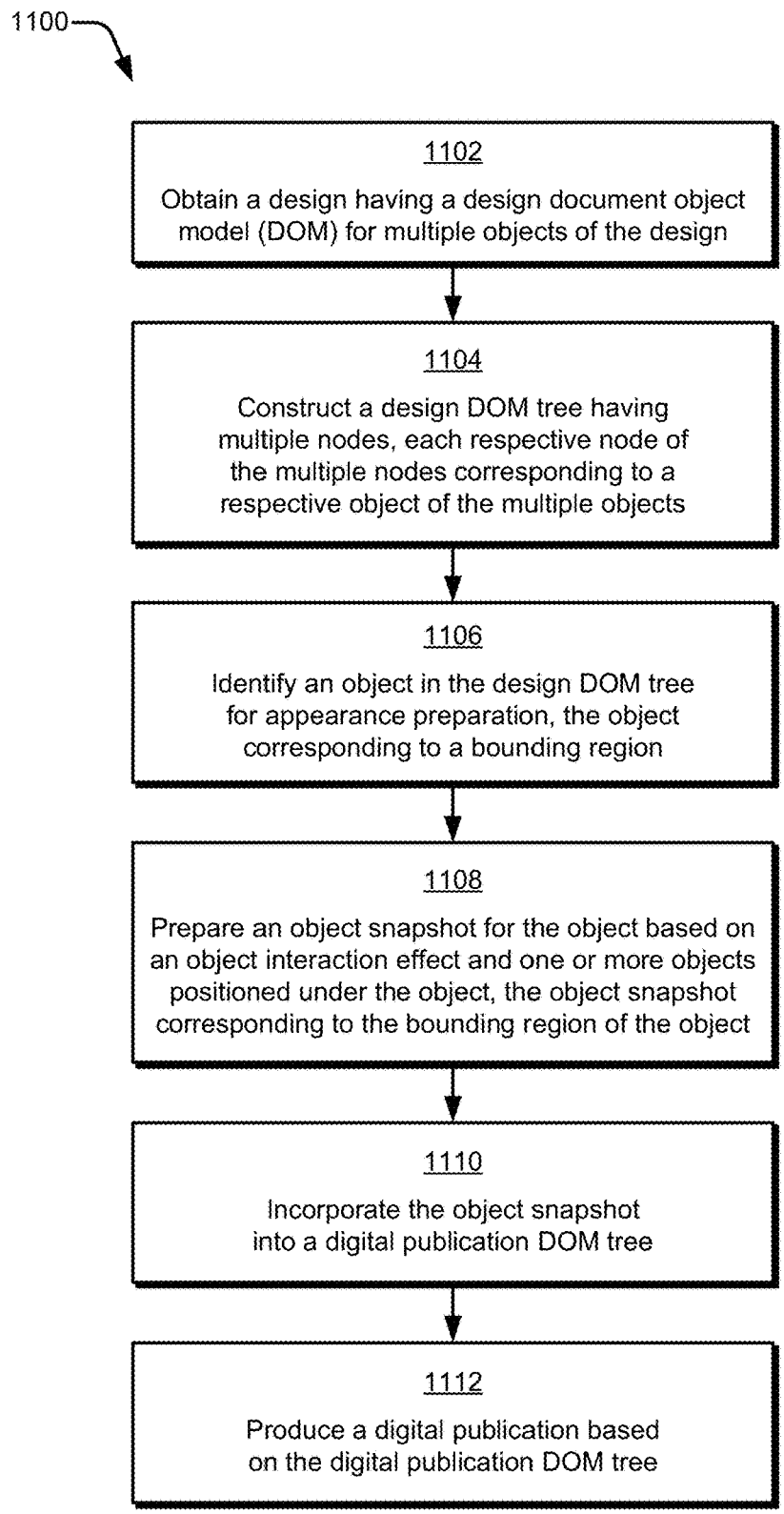
FIG. 11 is a flow diagram illustrating an example procedure in accordance with one or more example embodiments.
Figure 12:
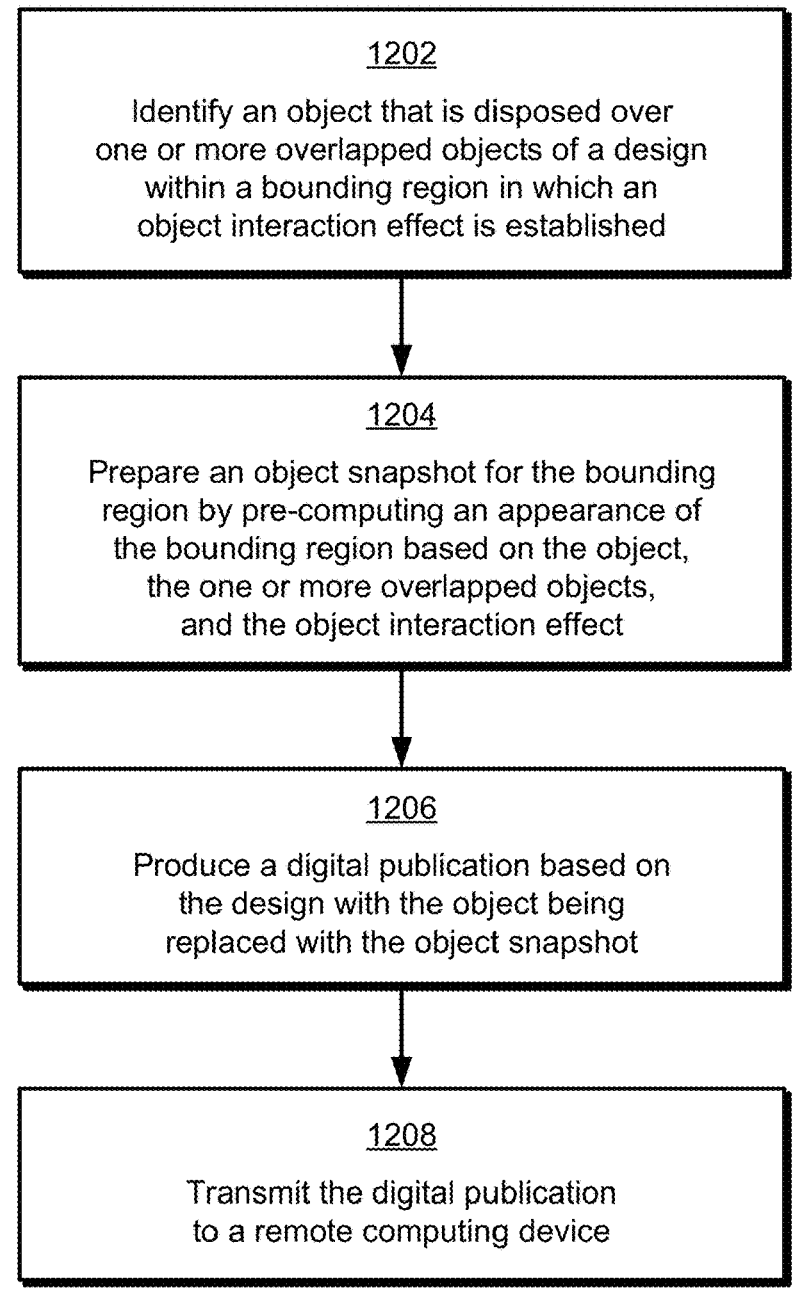
FIG. 12 is another flow diagram illustrating another example procedure in accordance with one or more example embodiments.

This section describes with reference to FIGS. 10-12 example procedures relating to object interaction preservation from design to digital publication in one or more embodiments. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by a suitably configured device, such as an example computing device 102 (of FIG. 1) or 1302 (of FIG. 13) using a digital publishing module 104 (e.g., of FIGS. 1, 2, 3, and 13). The description of the procedure of FIGS. 10-12 reference items from the previous FIGS. 1-8.

FIG. 10 is a flow chart illustrating an example procedure 1000 for preserving object interaction as a design 108 is converted to a digital publication 224 in accordance with one or more example embodiments. The procedure 1000 includes operations 1002-1032. By way of example, the procedure 1000 is directed to constructing a design DOM tree 204 and traversing the design DOM tree 204 to generate a digital publication DOM tree 220 in a web standards-related scenario. At operation 1002, a design obtainment module 302 obtains a design 108 with multiple objects 110. A design DOM tree 202 of the design 108 is parsed at operation 1004 by the design obtainment module 302 or a DOM tree construction module 304. At operation 1006, the DOM tree construction module 304 initializes an array for excluded objects to realize an excluded object set 602.

At operation 1008, the DOM tree construction module 304 constructs a design DOM tree 204 based on the design DOM 202. To do so, the DOM tree construction module 304 addresses each object 110 and corresponding node 502 that is to be included in the design DOM tree 204 with operations 1010 and 1012. Web-related attributes of an object 110 of the design 108 are generated and mapped to a node 502 of the design DOM tree 204 at operation 1010. At operation 1012, a planar location (e.g., at least one horizontal and vertical coordinate) of the object 110 is ascertained from the design 108 and saved to the corresponding node 502. Another object 110 for another corresponding node 502 is then selected to continue constructing the design DOM tree 204.

After each node 502 is included to construct the design DOM tree 204 at operation 1008, an object interaction analysis module 306 traverses the design DOM tree 204 node-by-node in, e.g., post order starting at operation 1014. At operation 1016, the object interaction analysis module 306 performs an object interaction analysis 206 on a given node 502 to determine if the object type of the given node 502 should be included or excluded from object appearance preparation. A dynamic or non-overlapping object 110 (e.g., a non-overlapping object is an object without other objects positioned underneath) is to be omitted from appearance preparation. This type of object is excluded from appearance preparation by adding each such object to the array of excluded objects, as shown for operation 1018. On the other hand, at operation 1020, an object 110 that overlaps another object and that is associated with an object interaction effect 112 is identified for snapshot replication and thus added to an identified object set 208. At operation 1022, the object interaction analysis module 306 determines if more nodes 502 have objects 110 that are to be analyzed. If so, the design DOM tree 204 is further traversed at operation 1014. If there are no more nodes 502 to analyze, the object interaction analysis module 306 hands off the procedure 1000 to an object snapshot preparation module 308.

For each object 110 that is identified for snapshot replication and included in the identified object set 208, operations 1024-1030 are performed by the object snapshot preparation module 308, and operation 1032 is performed by an object snapshot incorporation module 310. At operation 1024, the object snapshot preparation module 308 renders one or more objects below the identified object 110 in layered order. Any objects above the identified object 110 can be ignored. The object snapshot preparation module 308 also renders the identified object 110 over the lower, overlapped objects at operation 1026. At operation 1028, at least one object interaction effect 112 is applied to both the overlapping and overlapped objects as rendered. The object snapshot preparation module 308 can perform the rendering and the applying together.

After the object rendering and the object interaction effect applying, the object snapshot preparation module 308 takes an object snapshot 218 for a bounding region 210 corresponding to the identified object 110 at operation 1030. The object snapshot incorporation module 310 incorporates the object snapshot 218 into a digital publication DOM tree 220. For instance, at operation 1032, the object snapshot 218 can be stored as a bitmapped image that replaces the identified object 110 in a digital publication 224 that is produced by a digital publication production module 312. With a new identified object 110, the procedure 1000 then continues at operation 1024 until an object appearance for each of the identified objects 110 from the identified object set 208 have been pre-computed by the digital publishing module 104.

FIG. 11 is a flow diagram that includes six blocks 1102-1112 and that illustrates an example procedure 1100 for object interaction preservation from design to digital publication in accordance with one or more example embodiments. At block 1102, a design is obtained having a design DOM for multiple objects of the design. For example, a computing device 102 can obtain a design 108 having a design DOM 202 for multiple objects 110 of the design 108. A design obtainment module 302 may, for instance, retrieve the design 108 from memory or a remote source or may interact with an end user 106 to create the design 108.

At block 1104, a design DOM tree is constructed having multiple nodes, with each respective node of the multiple nodes corresponding to a respective object of the multiple objects. For example, a computing device 102 can construct a design DOM tree 204 having multiple nodes 502, with each respective node 502 of the multiple nodes 502 corresponding to a respective object 110 of the multiple objects 110. To do so, a DOM tree construction module 304 may encode characteristics of individual objects 110 and interobject relationships from the design DOM 202 into a tree-like structure having nodes 502 and links 504.

At block 1106, an object in the design DOM tree is identified for appearance preparation, with the object corresponding to a bounding region. For example, a computing device 102 can identify an object 110 in the design DOM tree 204 for appearance preparation, with the object 110 corresponding to a bounding region 210. For those objects associated with at least one object interaction effect 112, an object interaction analysis module 306 may identify objects 110 that are not characterized as having dynamic content and that overlap at least one other object 110.

At block 1108, an object snapshot is prepared for the object based on an object interaction effect and one or more objects positioned under the object, with the object snapshot corresponding to the bounding region of the object. For example, a computing device 102 can prepare an object snapshot 218 for the object 110 based on an object interaction effect 112 and one or more objects 110 positioned under the object 110, with the object snapshot 218 corresponding to the bounding region 210 of the object 110. For a planar spatial area of the design 108, an object snapshot preparation module 308 may rasterize a combined appearance of multiple overlapping layered objects 110 as the combined appearance is generated within the bounding region 210 by a design application.

At block 1110, the object snapshot is incorporated into a digital publication DOM tree. For example, a computing device 102 can incorporate the object snapshot 218 into a digital publication DOM tree 220. To implement the incorporation, an object snapshot incorporation module 310 may replace the object 110 of the design DOM tree 204 with the prepared object snapshot 218 in a corresponding node 502 of the digital publication DOM tree 220.

At block 1112, a digital publication is produced based on the digital publication DOM tree. For example, a computing device 102 can produce a digital publication 224 based on the digital publication DOM tree 220. A digital publication production module 312 may convert the digital publication DOM tree 220 into a digital publication DOM 222 that is used to generate the digital publication 224, which is suitable for dissemination over multiple digital publication channels.

FIG. 12 is a flow diagram that includes four blocks 1202-1208 and that illustrates an example procedure 1200 for object interaction preservation from design to digital publication in accordance with one or more example embodiments. At block 1202, an object is identified that is disposed over one or more overlapped objects of a design within a bounding region in which an object interaction effect is established. For example, a computing device 102 can identify an object 110 that is disposed over one or more overlapped objects 110 of a design 108 within a bounding region 210 in which an object interaction effect 112 is established. The object interaction effect 112 may be applied to at least one individual object 110 or a group of objects 110 within the bounding region 210, with the overlapping objects 110 disposed in different layers of the design 108. A digital publishing module 104 may identify such objects 110 by parsing a DOM for the design 108 or by traversing a DOM tree of the design 108.

At block 1204, an object snapshot is prepared for the bounding region by pre-computing an appearance of the bounding region based on the object, the one or more overlapped objects, and the object interaction effect. For example, a computing device 102 can prepare an object snapshot 218 for the bounding region 210 by pre-computing an appearance of the bounding region 210 based on the object 110, the one or more overlapped objects 110, and the object interaction effect 112. To do so, the digital publishing module 104 may capture a static image of a spatial area of the design 08 with the spatial area defined by the bounding region 210 so as to replicate the appearance of the spatial area as presented by a design application, including the object interaction effect 112 that alters a combined appearance of the overlapping objects 110.

At block 1206, a digital publication is produced based on the design with the object being replaced with the object snapshot. For example, a computing device 102 can produce a digital publication 224 based on the design 108 with the object 110 being replaced with the object snapshot 218. The digital publishing module 104 may maintain a layout or structure of a document, including object number or layering data thereof, to produce the digital publication 224 from the design 108 by substituting the identified object 110 with the prepared object snapshot 218, such as by replacing the identified object 110 with the prepared object snapshot 218 in a given node of at least one DOM tree.

At block 1208, the digital publication is transmitted to a remote computing device. For example, a computing device 102 can transmit the digital publication 224 to a remote computing device. To implement the transmission, the digital publishing module 104 may, for instance, email the digital publication 224 to a destination email address or upload the digital publication 224 to a web server.

Having described example procedures in accordance with one or more embodiments, consider now an example system and device that can be utilized to implement the various schemes and techniques described herein.

Example System and Device

Figure 13:
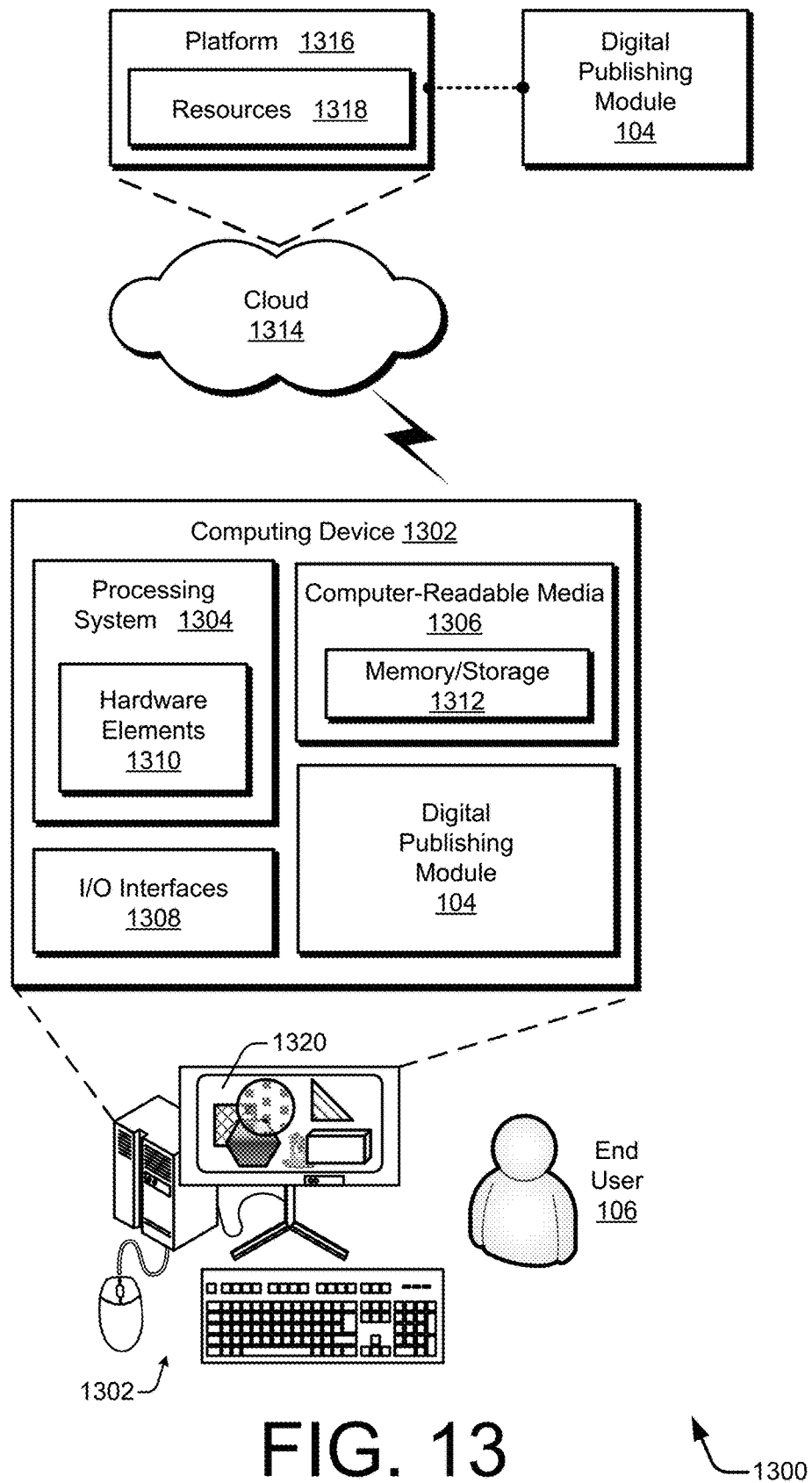
FIG. 13 illustrates an example system including various components of example devices that can be employed for one or more embodiments of object interaction preservation from design to digital publication.

FIG. 13 illustrates generally at 1300 an example system including an example computing device 1302 representative of one or more computing systems or computing devices that may implement the various techniques described herein. This is depicted through the inclusion of a digital publishing module 104, which may operate as described herein above. A computing device 1302 may be implemented as, for example, a computing device 102 (of FIG. 1) in an independent or standalone mode. The computing device 1302 can display a design, a digital publication, or objects thereof to the end user 106 via a display screen 1320. Generally, a computing device 1302 may be implemented as, for example, an end-user device (e.g., a smart phone or desktop computer) of an end user 106, a corporate device (e.g., a server side device or data center hardware) of a business, an on-chip system or system-on-a-chip (SOC) (e.g., that is integrated with a tablet device or a display device), or any other suitable computing device or computing system.

In an example implementation as shown in FIG. 1, the digital publishing module 104 is executing at one location (e.g., within a housing of the computing device 102). However, the digital publishing module 104 can alternatively be executing in the cloud (e.g., on a network-side computing device) if bandwidth is sufficiently large or transmission latency is sufficiently small, and such an example implementation as also shown in FIG. 13. Alternatively, a portion of the digital publishing module 104 can be executing at both a client-side computing device and a server-side computing device. In such an implementation, the operations implemented by the digital publishing module 104 as described herein may be distributed across a client-server architecture.

The example computing device 1302 as illustrated includes at least one processing system 1304, one or more computer-readable media 1306, and one or more I/O interfaces 1308 that may be communicatively coupled, one to another. Although not explicitly shown, the computing device 1302 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including one or more hardware elements 1310 that may be implemented as processors, functional blocks, and so forth. This may include implementation in hardware as an application specific integrated circuit (ASIC), a general-purpose processor, or other logic device formed using e.g. one or more semiconductors. The hardware elements 1310 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (e.g., random access memory (RAM)) or nonvolatile media (e.g., read only memory (ROM), flash memory, optical discs, or magnetic disks). The memory/storage component 1312 may include fixed media (e.g., RAM, ROM, or a fixed hard drive) or removable media (e.g., a flash memory card, a removable hard drive, or an optical disc). The computer-readable media 1306 may be implemented in a variety of other ways as further described below.

The input/output interface(s) 1308 are representative of functionality to allow a user to enter commands or information to computing device 1302 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., a liquid crystal display (LCD) screen, a light-emitting diode (LED) display screen, a monitor, or a projector), a speaker, a printer, a network card, a haptic vibrating device, or a combination thereof. Thus, the computing device 1302 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, fixed logic circuitry, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1306 may include a variety of media that may be accessed by the computing device 1302. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer readable instructions, data structures, program modules, logic elements/circuits, or other data. Examples of computer-readable storage media include RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1302, such as via a network. Computer-readable signal media may typically embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, computer-readable signal media include wired media, such as a wired network or direct-wired connection, or wireless media, such as acoustic, RF, microwave, infrared, or other wireless media.

As previously described, hardware elements 1310 or computer-readable media 1306 may be representative of modules, programmable device logic, fixed device logic, a combination thereof, and so forth that are implemented in a hardware form that may be employed in some embodiments to implement at least some aspects of the techniques described herein, such as to perform one or more instructions or computing actions. Hardware may include components of an integrated circuit (IC) or on-chip system, an ASIC, a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1310. The computing device 1302 may be configured to implement particular instructions or functions corresponding to software or hardware modules. Accordingly, implementation of a module that is executable by the computing device 1302 as software may be achieved at least partially in hardware, e.g., through use of computer-readable storage media or the hardware elements 1310 of the processing system 1304. The instructions or functions may be executable/operable by one or more articles of manufacture (e.g., one or more computing devices 1302 or processing systems 1304) to implement techniques, modules, or examples described herein.

The techniques described herein may be supported by various configurations of the computing device 1302 and are not limited to the specific aspects of the example devices described herein. This functionality may also be implemented fully or partially through use of a distributed system, such as over a "cloud" 1314 via a platform 1316 as described below.

The cloud 1314 may include or represent a platform 1316 for resources 1318. The platform 1316 abstracts underlying functionality of hardware (e.g., one or more servers or at least one data center) and software resources of the cloud 1314. The resources 1318 may include applications or data that can be utilized while computer processing is at least partially executed on servers remote from, or distributed around, the computing device 1302. Resources 1318 may also include services provided over the Internet or through a subscriber network, such as a cellular or Wi-Fi network.

The platform 1316 may abstract resources and functions to connect the computing device 1302 with other computing devices or services. The platform 1316 may also serve to abstract a scaling of resources to provide a corresponding level of scale to encountered demand for the resources 1318 implemented via the platform 1316. Accordingly, in an interconnected device embodiment, implementation of functionality described herein may be distributed throughout the illustrated system of FIG. 13, or at least throughout the cloud 1314 along with the computing device 1302. For example, functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   constructing, by the at least one computing device, a design document object model (DOM) tree having multiple nodes, at least one node of the multiple nodes corresponding to a respective object of multiple objects from a design DOM of a design;
   identifying, by the at least one computing device, an object interaction effect between the respective object and at least one other object that is overlapped by the respective object;
   determining, by the at least one computing device, a bounding region that maps to a spatial area of the design that contains the respective object and the object interaction effect with the at least one other object;
   generating, by the at least one computing device, an object snapshot for the object by pre-computing an appearance of the respective object with the at least one other object within the bounding region based on the object interaction effect; and
   replacing, by the at least one computing device, the respective object in the design DOM tree with the object snapshot.

2. The method as described in claim 1, wherein the respective object and the at least one other object are disposed in different layers of the design DOM.

3. The method as described in claim 1, wherein the object snapshot is a bitmap.

4. The method as described in claim 1, wherein the object snapshot is a static image.

5. The method as described in claim 1, wherein:
   the object snapshot comprises a static image; and
   the generating of the object snapshot includes generating the static image based on an appearance of the respective object as established by the at least one other object positioned under the respective object in conjunction with the object interaction effect, which is associated with the respective object.

6. The method as described in claim 1, wherein the preparing comprises generating the object snapshot by merging an appearance of the respective object and an appearance of the at least one other object positioned under the respective object based on the object interaction effect to establish a visual appearance of the bounding region in the design.

7. The method as described in claim 1, wherein the replacing of the respective object at the at least one node of the design DOM tree with the object snapshot generates a digital publication DOM tree.

8. The method as described in claim 1, further comprising producing a digital publication based on the design DOM tree with the object snapshot so as to present the object snapshot as having an appearance that reflects the respective object as interactive with the at least one other object positioned under the respective object within the bounding region of the respective object in accordance with the object interaction effect of the design.

9. The method as described in claim 1, wherein the bounding region contains a portion of the at least one other object that is overlapped by the respective object but does not contain a different portion of the at least one other object that is not overlapped by the respective object, and wherein the design includes at least one additional object that is not contained within the bounding region.

10. At least one computing device operative in a digital medium environment in which an interactive appearance of layered objects in a design is to be preserved during a conversion to a digital publication, the at least one computing device including a processing system and at least one computer-readable storage medium, the at least one computing device comprising:
    document object model (DOM) tree construction module to construct a design DOM tree having multiple nodes that respectively correspond to multiple objects of a design;
    an object interaction analysis module to identify an object interaction effect between an object in the design DOM tree and one or more objects positioned under the object;
    an object snapshot preparation module to prepare an object snapshot that replicates an appearance of a bounding region that maps to a spatial area of the design that contains the object and the object interaction effect with the one or more objects positioned under the object;
    an object snapshot incorporation module to replace the object in the design DOM tree with the object snapshot; and
    a digital publication production module to produce a digital publication based on the design DOM tree.

11. The at least one computing device as described in claim 10, wherein:
    the bounding region comprises an indicator of a planar location of a region in the design and an indicator of a size of the region; and
    the object is disposed in a given layer of the design, and the one or more objects positioned under the object are disposed in one or more layers of the design that are lower than the given layer of the design.

12. The at least one computing device as described in claim 10, wherein a size of the bounding region is dependent on one or more characteristics of the object or on one or more object interaction attributes for the object and the one or more objects positioned under the object.

13. The at least one computing device as described in claim 10, wherein the object snapshot preparation module is configured to pre-compute the appearance of the bounding region by applying the object interaction effect to the object in conjunction with the one or more objects positioned under the object within the bounding region.

14. The at least one computing device as described in claim 10, wherein the object snapshot incorporation module is configured to replace the object in the design DOM tree with the object snapshot in the digital publication DOM tree.

15. The at least one computing device as described in claim 10, wherein the digital publication production module is configured to export the digital publication from a design application.

16. At least one computing device comprising:
    a processing system; and
    a computer-readable storage medium that is non-transitory and having instructions stored thereon that, responsive to execution by the processing system, causes the processing system to perform operations comprising:
       identifying an object interaction effect corresponding to an object that is disposed over one or more overlapped objects of a design;
       preparing an object snapshot as a bitmap for a bounding region that maps to a spatial area of the design that contains the object and the object interaction effect with the one or more overlapped objects by pre-computing an appearance of the bounding region;

producing a digital publication based on the design with the object being replaced with the object snapshot; and transmitting the digital publication to a remote computing device.

17. The at least one computing device as described in claim 16, wherein the object interaction effect comprises at least two different object interaction effects, including at least one blending effect.

18. The at least one computing device as described in claim 16, wherein the identifying comprises:

traversing a design document object model (DOM) tree including multiple nodes having multiple objects; and analyzing the multiple objects to identify overlapping layered objects having an appearance that is affected by interactive visual effects.

19. The at least one computing device as described in claim 16, wherein:

the object snapshot comprises a static image; and the preparing comprises generating the static image by merging an appearance of the object and an appearance of the one or more overlapped objects in accordance with the object interaction effect.

20. The at least one computing device as described in claim 16, wherein:

the at least one computing device is configured to perform operations further comprising incorporating the object snapshot into a digital publication document object model (DOM) tree that is based on a design DOM tree including a node having the object; and the producing comprises producing the digital publication based on the digital publication DOM tree.

* * * * *